US011588556B1

(12) United States Patent
Conrad et al.

(10) Patent No.: US 11,588,556 B1
(45) Date of Patent: Feb. 21, 2023

(54) HIGH BANDWIDTH INDIVIDUAL CHANNEL CONTROL VIA OPTICAL REFERENCE INTERFEROMETRY CONTROL SYSTEM ARCHITECTURE

(71) Applicant: Massachusetts Institute of Technology, Cambridge, MA (US)

(72) Inventors: Stephen Conrad, Bedford, MA (US); Adam Alexander Libson, Newton, MA (US); Andrew Benedick, Stow, MA (US); Dale H. Martz, Somerville, MA (US); Jonathan Twichell, Acton, MA (US); Eli Doris, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/335,321

(22) Filed: Jun. 1, 2021

Related U.S. Application Data

(60) Provisional application No. 63/058,692, filed on Jul. 30, 2020.

(51) Int. Cl.
    H04B 10/50 (2013.01)
    H04B 10/67 (2013.01)
    H04B 10/548 (2013.01)

(52) U.S. Cl.
    CPC ..... H04B 10/50577 (2013.01); H04B 10/548 (2013.01); H04B 10/675 (2013.01)

(58) Field of Classification Search
    None
    See application file for complete search history.

(56) References Cited

U.S. PATENT DOCUMENTS

| 5,329,260 A * | 7/1994 | Poplin | H03C 5/00 332/119 |
|---|---|---|---|
| 6,366,356 B1 * | 4/2002 | Brosnan | H01S 3/067 356/477 |
| 6,813,069 B2 | 11/2004 | Rice et al. | |
| 7,440,174 B2 | 10/2008 | Rice et al. | |
| 2015/0365177 A1 * | 12/2015 | Blumenthal | H04B 10/40 398/9 |

(Continued)

OTHER PUBLICATIONS

Goodno et al., "Multichannel polarization stabilization for coherently combined fiber laser arrays", Oct. 15, 2012, Optics Letters / vol. 37, No. 20, pp. 4272-4274 (Year: 2012).*

(Continued)

*Primary Examiner* — David W Lambert
(74) *Attorney, Agent, or Firm* — Smith Baluch LLP

(57) ABSTRACT

A High Bandwidth Individual Channel Control via Optical Reference Interferometry (HICCORI) system actively controls the phase and/or polarization of the optical emission of each element in a tiled optical array. It can also actively align any high-frequency broadening waveform applied to the array beams for spectral broadening or data transmission. By maintaining consistent polarization and manipulating the phase relationships of the beams emitted by the array elements, the HICCORI system can manipulate the spatial pattern of constructive and destructive interference formed as the individual emissions coherently combine. Active feedback control allows the desired phase, polarization, and/or spectral broadening alignment to be maintained in the presence of external disturbances.

16 Claims, 14 Drawing Sheets

(56) References Cited

U.S. PATENT DOCUMENTS

2021/0063635 A1* 3/2021 Goodno .............. H01S 3/06754

OTHER PUBLICATIONS

Anderegg et al., "8-W coherently phased 4-element fiber array." Proc. SPIE—Advances in Fiber Lasers. vol. 4974. International Society for Optics and Photonics, 2003. 7 pages.

Goodno et al., "Automated co-alignment of coherent fiber laser arrays via active phase-locking." Optics Express 20.14 (2012): 14945-14953.

Goodno et al., "Multichannel polarization stabilization for coherently combined fiber laser arrays." Optics Letters 37.20 (2012): 4272-4274.

Weiss et al., "Group delay locking of coherently combined broadband lasers." Optics Letters 37.4 (2012): 455-457.

* cited by examiner

HIGH BANDWIDTH INDIVIDUAL CHANNEL CONTROL VIA OPTICAL REFERENCE INTERFEROMETRY CONTROL SYSTEM ARCHITECTURE

CROSS-REFERENCE TO RELATED APPLICATION(S)

This application claims the priority benefit, under 35 U.S.C. 119(e), of U.S. Application Ser. No. 63/058,692, filed on Jul. 30, 2020, which is incorporated herein by reference in its entirety for all purposes.

GOVERNMENT SUPPORT

This invention was made with Government support under Grant No. FA8702-15-D-0001 awarded by the U.S. Air Force. The Government has certain rights in the invention.

BACKGROUND

A typical coherently combined optical system or optical phased array includes a single laser source whose output is split N ways to seed N individual amplified optical paths. The output of each path is then transmitted, often via fiber, to an individual element in a tiled optical array, which launches the energy into free space. After passing through some number of free space optical components, the energy from the array propagates out of the system.

The emission from each element in the array diverges as it propagates due to diffraction, causing the energy to spread over a relatively large field of regard at some distance. The coherent combination of the emissions from each element over this area can result in a non-uniform distribution of combined optical intensity. Constructive interference occurs at spatial locations where the phases of the elements are well-matched, and destructive interference occurs at spatial locations where the phases of the elements are mismatched, producing an intensity variation in the far field.

Unfortunately, typical coherently combined optical systems employ amplification stages, optical fiber, and optomechanical structures, which cannot maintain a stable optical phase delay or output polarization state. Without an active control system, the phase and polarization of the optical emission of each element in the array changes continuously over time with respect to the phases and polarizations of the other elements in the array. This results in an uncontrolled and ever-changing intensity distribution pattern spread across the entire field of regard as the coherent combination of the emissions transition between various degrees of constructive and destructive interference at each spatial location.

It is typical for an optical phased array system to actively manipulate the phases and polarizations of the N seeds to realize respective changes in the states of the free-space emissions from the elements of the array. A phase modulator with an actuation range of greater than ±π is sufficient for systems employing a sufficiently narrow linewidth seed laser. Within the constraints of the coherence length of the seed, optical phase delays differing by an integer number of full phase revolutions are functionally equivalent.

Certain systems introduce very high-frequency phase change sequences that effectively broaden the linewidth of the seed and reduce the coherence length. Communication systems may employ phase-shift keying for encoding information. Other systems may use repeating spectral broadening waveforms to suppress stimulated Brillouin scattering. These waveforms should align in time at the point of coherent combination by either actively compensating the phase delay in each channel over a large throw or by independently applying an identical waveform to each seed with an adjustable time alignment.

It is possible to increase or maximize constructive interference of the individual emissions so that a significant portion of the total emitted energy focuses into a relatively small high-intensity spot. This can be accomplished by maintaining the phase of the emission of each element in the array at some offset with respect to the phases of the other elements. More generally, phase offsets can be applied to manipulate the wavefront to control tip, tilt, focus, and higher-order Zernike modes, which may facilitate compensation of optical aberrations.

A feedback control system can observe or estimate the current state of the array, determine the desired phase and/or polarization corrections, and apply those corrections to the array elements. The feedback control system's stability and performance can be analyzed using established mathematical methods. One performance metric for the feedback control system is how well it observes and corrects deviations from the desired state due to vibration, thermal changes, and other external factors. In general, increasing the feedback loop bandwidth for each channel improves this disturbance rejection performance.

Predominant existing methods for coherently combined optical array control, including LOCSET (Locking of optical coherence via single-detector electron-frequency tagging) and SD-SPGD (Single detector stochastic parallel gradient decent), use a single feedback signal, which is a surrogate for the on-axis, far-field intensity of the entire array. These control methods work to maximize the on-axis far-field intensity by adjusting each elements phase and polarization to maximize the feedback signal.

FIG. 13 illustrates a coherent beam combining system 1300 that uses a single feedback signal to control the relative phases of the array outputs. The system 1300 includes optics 1310, phase-sensing components 1320, and phase control components 1330. The optics 1310 include a seed laser 1301, such as a fiber laser or other narrow-linewidth source, that emits a seed laser beam. A splitter 1311 divides the power in the seed laser beam into N channels (in FIG. 13, N=4), each of which includes a phase modulator 1312, optical amplifier 1315, and emitting element 1316 (e.g., a collimating lens). Each phase modulator 1312 applies a unique phase dither to its channel.

A beam sampler 1317, such as a bulk optic beam splitter, directs a portion of the beams emitted by the emitting elements 1316 to a lens 1325 that focuses these beam portions on a single-element detector 1326. The intensity detected by the detector 1326 fluctuates with the phase dithers applied to the different channels by the phase modulators 1312 and with environmentally induced phase perturbations. Measurement circuitry 1327 (e.g., a field-programmable gate array (FPGA)) digitally mixes the sampled photodetector output with each dither sequence 1328 and filters the result to produce a phase estimate relating the channel phase to the mean phase of the ensemble. Control circuitry 1331 (e.g., implemented in the same FPGA as the measurement circuitry 1327) calculates the difference between the target phase offset, (typically zero), and the estimate to form an error signal. The control circuitry 1331 drives the corresponding channel phase actuator 1312 in a manner that reduces the magnitude of the error signal.

LOCSET utilizes sinusoidal dithers at unique frequencies, which is a frequency division multiplexing approach to share the feedback signal amongst the elements. SD-SPGD employs orthogonal discrete time periodic sequences for the dither waveforms, which represents a spread-spectrum code division multiplexing approach. The assignment and application of the unique dither waveforms are centrally coordinated across the array.

For LOCSET and SD-SPGD, the dither actuation and the feedback signal bandwidth must each meet or exceed the product of the element count N and the per-element measurement bandwidth required for the application. This leads to challenges for arrays with many elements, as the bandwidth of the hardware components increases linearly with channel count to maintain a given control performance. This increase in bandwidth makes it impractical to control large numbers of elements with a single feedback signal.

In addition, the dithering employed in approaches that use a single feedback signal directly affects the phase alignment of the array, resulting in some loss of combining efficiency. For this reason, the combined amplitude of the dithers must remain sufficiently small. As the channel count is increased, the dither of each individual channel produces a smaller percentage change in the feedback signal. This makes the process of estimating the phase error of each channel increasingly sensitive to noise. As channel count increases, the net spectral noise density in the feedback signal must be reduced proportionally to maintain a constant control performance.

With LOCSET, SD-SPGD, and other approaches based on a single feedback signal for the entire array, the ability to manipulate the phase relationship of the elements of the array is limited by the single on-axis far-field intensity measurement of the feedback signal. As the wavefront is manipulated (e.g., as the location of peak coherent combination is shifted away from optical axis), the feedback signal power drops and the controller can no longer actively maintain the phasing of the array by maximizing the feedback signal. Approaches have been developed which time-interleave periods of on-axis active (closed-loop feedback) phase control with periods of open-loop wavefront manipulation, but these approaches directly impair the ability of the system to suppress the effects of external disturbances.

SUMMARY

Instead of using a single feedback signal for an entire array, the control architecture disclosed here uses one feedback signal per array element. Each of these feedback signals is generated by interfering the corresponding array beam with a reference signal common to the entire array. The resulting beat note can be used to adjust the phase, polarization, and/or spectral broadening of the corresponding array beam with respect to the common reference signal. Advantages of this control architecture over other control architectures include robust rejection of external disturbances, the ability to scale to high element count arrays without high-bandwidth electronics, elimination of dither losses associated with other approaches, reduced noise sensitivity, and the ability to actively control each element to any desired phase relationship (wavefront manipulation) without degradation of active disturbance rejection performance.

A system that uses one feedback signal per array element may include a seed laser, at least one first beam splitter, a reference modulator, at least one second beam splitter, and, for each array beam/element, a photodetector, sensing electronics, control electronics, and a phase modulator. In operation, the seed laser emits a seed beam, which the first beam splitter splits into a reference beam and N array beams, where N is a positive integer greater than 1. The reference modulator modulates the reference beam at a heterodyne reference frequency, and the second beam splitter couples respective portions of the N array beams to the photodetectors. Each photodetector senses a heterodyne beat tone generated by interference of the corresponding array beam in the N array beams with at least a portion of the reference beam. The corresponding sensing electronics, which are operably coupled to the photodetector, generate a phase estimate based on the heterodyne beat tone. The corresponding control electronics, which are operably coupled to the sensing electronics, generate a phase error signal based on the phase estimate and on a phase target for the corresponding array beam. The phase target is based on (i) a desired phase offset of the corresponding array beam relative to the other array beams, (ii) a bias affecting measurement of the phase estimate by the sensing electronics, and (iii) a measurement from an external feedback loop. And the corresponding phase modulator, which is operably coupled to the control electronics, modulate a phase of the corresponding array beam based on the phase error signal.

In this architecture, the sensing electronics, control electronics, and photodetectors have respective operating bandwidths independent of N, which can be a huge advantage when scaling to large values of N. The sensing and control electronics can be implemented in a field-programmable gate array. The sensing electronics can also detect in-phase (I) and quadrature (Q) components of the heterodyne beat tone and estimate a phase difference between the reference beam and the corresponding array beam based on the I and Q components. The sensing electronics can also generate a magnitude of the beat tone based on the I and Q components, in which case the control electronics can control a polarization and a broadening waveform modulation of the corresponding array beam based on the magnitude of the beat tone. For example, the reference modulator can modulate the reference beam with first and second dither signals for controlling the polarization of the corresponding array beam and modulate the reference beam with a third dither signal for controlling the broadening waveform modulation of the corresponding array beam.

In some cases, the control electronics can also be configured to determine a polarization state of the corresponding array beam based on an amplitude of the heterodyne beat tone. In these cases, a polarization controller may manipulate the polarization state of the corresponding array beam based on feedback from the control electronics.

The system can also include a waveform generator and another reference modulator. The waveform generator generates a spectral broadening waveform. The other reference modulator modulates the reference beam with a reference copy of the spectral broadening waveform. And each of the N array beams is modulated with corresponding copy of the spectral broadening waveform using a corresponding modulator operably coupled to the waveform generator. In these cases, the control electronics can detect alignment of the reference copy of spectral broadening waveform modulated onto the reference beam with respect to the corresponding copy of the spectral broadening waveform modulated onto the corresponding array beam and trim the corresponding copy of the spectral broadening waveform driving the modulator.

The control electronics can determine the phase error signal. They can also store the phase estimate, the phase target, and the phase error signal as respective digital numbers ranging from $-\pi$ to $+\pi$. The phase error signal can be a sum of (i) the desired phase offset, (ii) the bias, and (iii) the measurement from the external feedback loop, and the control electronics can perform integer rollover on the sum (which may have an absolute value greater than $|\pi|$) so that the phase error signal is a digital number ranging from $-\pi$ to $+\pi$. Similarly, the control electronics are configured to generate the phase target by subtracting the phase error signal from the phase estimate and perform integer rollover on the phase target so that the phase target is a digital number ranging from $-\pi$ to $+\pi$.

All combinations of the foregoing concepts and additional concepts discussed in greater detail below (provided such concepts are not mutually inconsistent) are part of the inventive subject matter disclosed herein. All combinations of claimed subject matter appearing at the end of this disclosure are part of the inventive subject matter disclosed herein. The terminology used herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
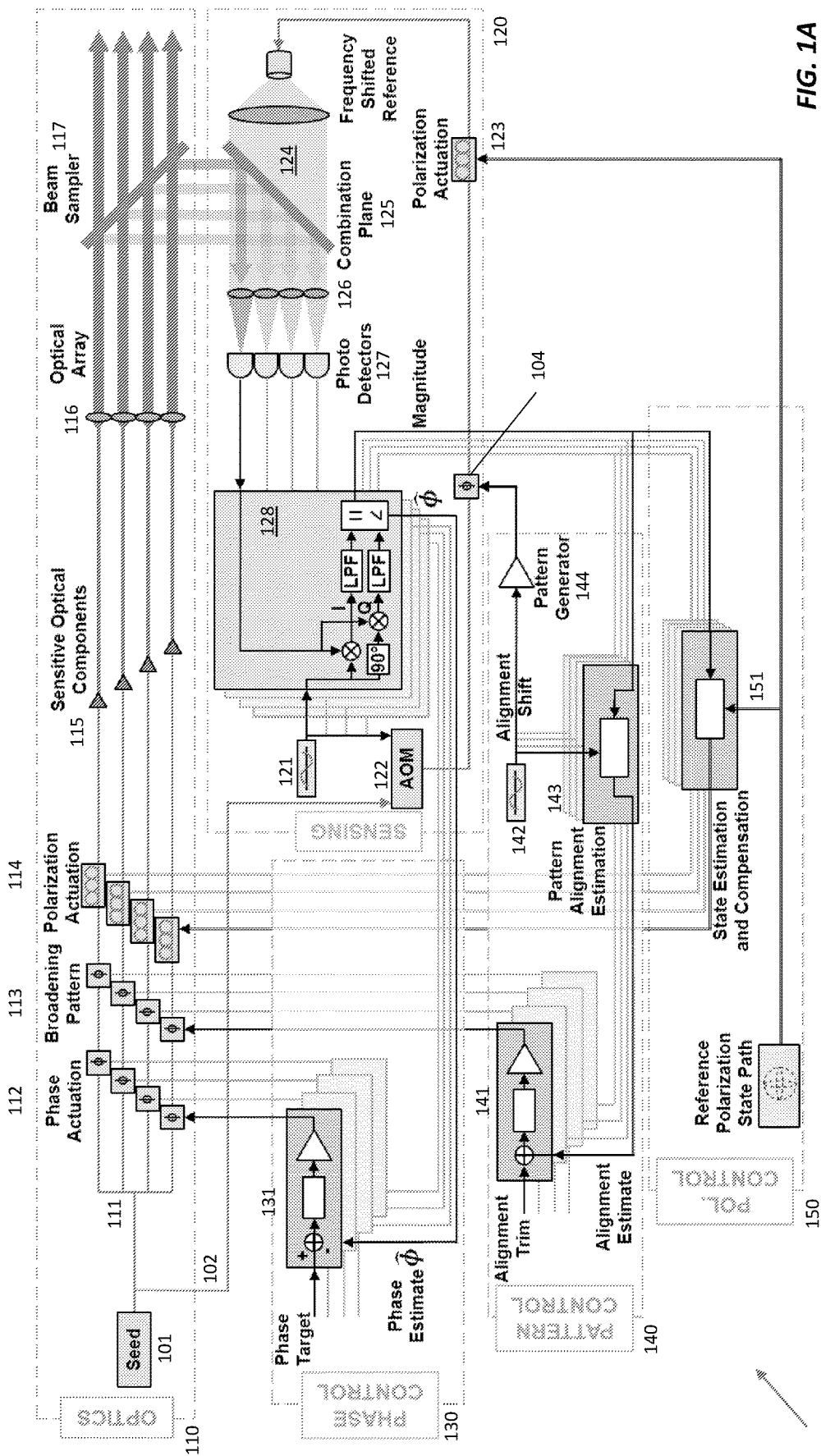
FIG. 1A shows a High-bandwidth Individual Channel Control via Optical Reference Interferometry (HICCORI) control system.

High-bandwidth Individual Channel Control via Optical Reference Interferometry (HICCORI) can be used to control coherent beam combining systems and optical phased arrays with arbitrary numbers of beams or elements. It can be used to point and steer (high-power) coherent optical beams for free-space optical communications, laser cutting, welding, etching, drilling, surface ablation, additive manufacturing (laser sintering), lidar, laser surface profilometry, optical tweezers, and other beam scanning applications. The HICCORI architecture is applicable to both CW (continuous wave) and puled laser systems.

Unlike other beam control architectures, HICCORI uses modular power and control scaling to overcome the practical limitations on the amount of power that can be carried in a single optical fiber. With HICCORI, any number of fiber-coupled laser beams can be combined to achieve the desired power levels. With HICCORI, instead of re-designing a single monolithic laser source to produce more power, it is possible combine beams from many fiber amplifiers, which operate with relatively good electrical efficiency for greater wall-plug efficiency.

HICCORI enables high-speed wavefront manipulation, allowing for steering, scanning, focus control, and compensation of optical aberrations. The speed (bandwidth) achievable by the HICCORI architecture is much greater than can be achieved with physical scanners, such as galvanometers and deformable mirrors. The high-speed wavefront manipulation enabled by HICCORI can be leveraged to compensate for the relative motion of the workpiece and the optical head in laser machining processes. This could relax requirements on the positioning mechanisms (machine axes, robot arm, etc.) used to hold the workpiece and/or the optical head. It could also be utilized to provide compensation for mechanical vibrations. This could also allow operations on a rapidly rotating workpiece like some diamond turning processes. Wavefront manipulation enabled by HICCORI could be employed to compensate for aberrations caused by hot gasses generated between the optical head and the workpiece during ablation.

HICCORI offers several advantages that can be leveraged to increase production rate in laser machining. Modular power scaling can be leveraged to increase the laser power and expedite power-limited applications. Fast wavefront manipulation can be leveraged to provide beam steering, scanning, and/or focus adjustment at increased rates. And increased scan rates and system power levels can increase process throughput.

For example, in laser drilling, the optical head must be positioned relative to the work piece with a finite time for that motion to settle. Then, as the laser ablates material, the focus is adjusted to compensate for the deepening hole. With HICCORI the power could be scaled up, the settling time could be reduced/eliminated, and the focus adjustment could be executed more rapidly.

In addition, the ability to transmit optical energy from the laser source to the optical head with a fiber bundle increases flexibility in machine design. This could eliminate the complex free-space optical paths found in some existing machinery (like flatbed laser cutters). This could also eliminate the need to collocate the laser source at the optical head for robotic arm applications, reducing robot payload.

The ability of the HICCORI to provide high-speed wavefront manipulation within the context of a larger process employing additional sensors and control loops enables new capabilities. In a laser welding process, for example, HICCORI may be leveraged to make rapid fine adjustments to energy delivery based on feedback from sensors monitoring the state of the melt pool and surrounding material. Through wavefront manipulation by HICCORI, the heating and cooling profile of the weld could be actively controlled.

HICCORI can also be used for fast, precise sensing and measurement in automotive, medical, and scientific applications. HICCORI can perform high-speed scanning with no moving parts, increasing scanning rates and potentially improving reliability and reducing cost. HICCORI wavefront manipulation could be utilized to project a focused spot or controlled speckle pattern on a surface. Observing the optical return from the surface could be utilized to measure the surface profile. The beam pattern could also be varied to trap and manipulate particles, including ions and particles in fluid.

HICCORI Architecture

FIG. 1A shows a modular HICCORI system 100. This system 100 has an architecture that measures and controls each element in an array independently relative to a common reference 124. This per-element control architecture allows the sensing, processing, and actuation associated with the control of each element in the array to occur independently from that of all other elements in the array. This enables the architecture to accommodate arrays of any number of elements without any fundamental degradation in performance. The physical and computational resources that support a single element are merely replicated to support each element in the array.

The architecture can be described in terms of three distinct functions: (1) signal generation, (2) sensing, and (3) control, which may or may not be closely integrated in a given implementation. Signal generation is implemented with optical components 110. Sensing is implemented with sensing components 120 and encompasses the aspects of the architecture that support the measurement of the optical phase, polarization, and/or broadening waveform alignment of each element relative to a single common reference. Control encompasses the utilization of these measurements and other external inputs to calculate and apply appropriate corrections to the optical phase, polarization, and/or broadening. Control is implemented using phase control components 130, broadening waveform or pattern control components 140, and polarization control components 150. In practice, some or all of the electronic sensing components 120, phase control components 130, pattern control components 140, and polarization control components 150 can be implemented in one or more FPGAs, which determine the desired phase, polarization, and/or broadening waveform or pattern shifts (alignment estimation, trim calculations, feed-forward and feed-back calculations etc.).

Signal Generation

The optical components 120 used to generate the system output include a narrow linewidth seed laser 101, such as a fiber laser, that emits a seed laser beam (also called a seed or seed beam). A beam splitter 111 splits this seed laser beam into N array channels and into a separate reference channel 102. Each array channel includes a first phase modulator 112 for phase control, a second phase modulator 113 for applying a broadening waveform, a polarization controller 114 for controlling the beam polarization, an optical amplifier 115, and an emitting element 116, such as a collimating lens 116. These components can be fiber-coupled components, free-space components, integrated components, or a combination thereof. A beam sampler 117, such as a diffractive element or beam splitter, splits off portions of the array beams for sensing and control (described below).

Sensing

Figure 1B:
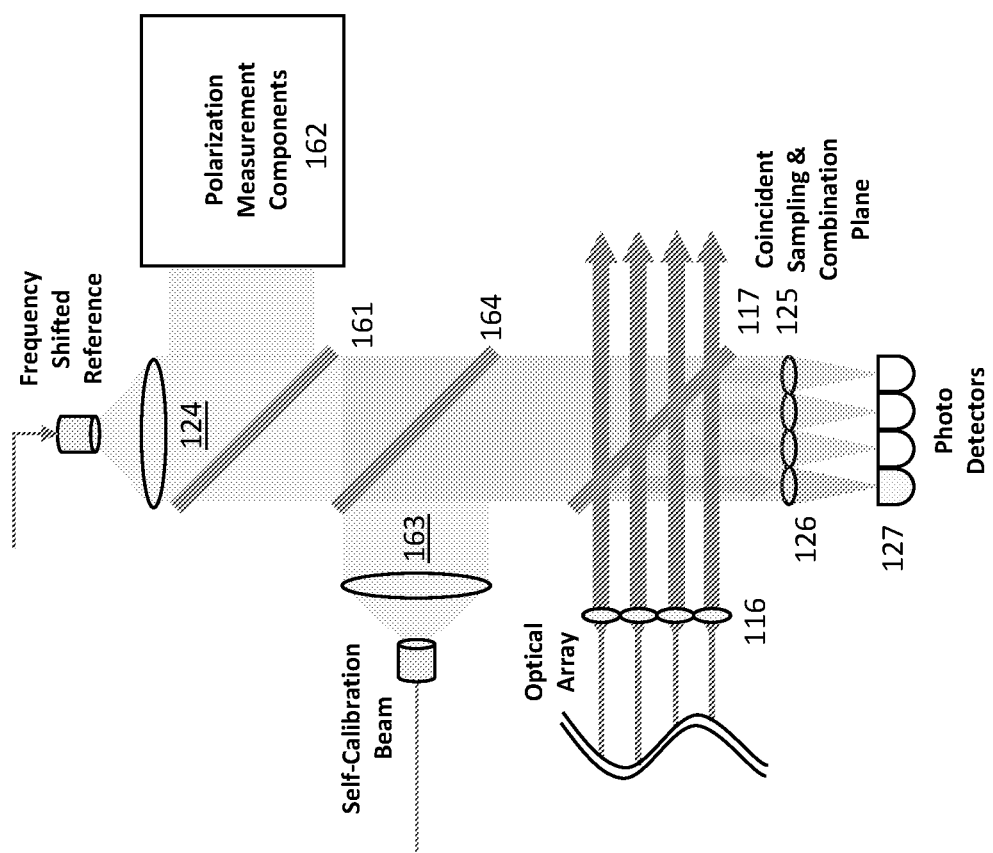
FIG. 1B shows a detail view of alternate optical configuration and optional components in a HICCORI system.

Sensing leverages a heterodyne optical measurement between a small portion of the optical emission of each element and a common optical reference 102 as shown in the FIG. 1A. The optical reference 102 originates from an additional split from the laser source 101 that seeds the channels in the array. This signal is shifted in frequency, e.g., by an amount $\omega_o$ from a radio-frequency (RF) synthesizer 121 with an acousto-optic modulator (AOM) 122 or similar device, to provide a heterodyne reference 124. A broadening waveform or pattern phase modulator 104 modulates the heterodyne reference 124 with the same broadening waveform or pattern (described below) that is imparted onto the channel beams by the second set of phase modulators 113. The heterodyne reference 124 is then expanded to interfere with a sample of each beam in the array in a combination plane 125 (e.g., with an optional beam splitter). FIG. 1B depicts an alternate physical arrangement in which the sampling plane 117 and the combination plane 125 are coincident. This configuration may improve the optical stability for certain applications and is described in greater detail below. After the introduction of the reference beam 124, the subsequent stages in the sensing process occur independently on a per-channel basis.

For each channel, the frequency difference between the reference beam 124 and the channel results in an instantaneous phase relationship which periodically transitions in and out of alignment, resulting in a combined intensity which fluctuates sinusoidally (producing a beat tone), at a frequency of $\omega_o$. A shift in the channel phase results in a corresponding shift in the phase of the beat tone while the amplitude of the tone remains unchanged. The amplitude of the beat tone is, however, a function of the alignment of the polarization states of the two beams and on the alignment of a broadening waveform applied to the reference beam 124 and each channel. The amplitude of the beat tone is maximized when the polarization states are precisely aligned with each other, and the broadening waveforms are precisely aligned.

The system 100 includes a photodetector 127 for each array channel (i.e., N photodetectors for N array channels). Each of these photodetectors 127 converts the fluctuations in optical intensity of the interference between the reference beam 124 and the corresponding array beam caused by changes in the relative phases, polarization states, and broadening waveforms into an electrical signal. Each photodetector 127 is coupled to a dedicated sensing circuit 128 (e.g., implemented with a field-programmable gate array (FPGA) as discussed below), which is also coupled to the RF synthesizer 121 that generates the heterodyne signal for driving the AOM 122. The dedicated sensing circuit 128 demodulates the photodetector output by a sinusoid of frequency $\omega_o$, which is aligned in phase with the drive waveform for the AOM 122 to produce an In-phase component (I). The sensing circuit 128 also demodulates the photodetector output by a sinusoid shifted by $\pi/2$ radians to produce a quadrature component (Q). Low-pass filters (LPFs) in the sensing circuit 128 low-pass filter the I and Q signals to retain the desired frequency content (DC to $\omega_o$) and to eliminate higher-order tones. The four-quadrant inverse tangent of the filtered I and Q components yields the optical phase measurement of the channel relative to the reference 124. In recognition of the fact that noise and other factors introduce some uncertainty in the measurement, the result is referred to as the phase estimate $\hat{\phi}$. The Euclidean norm of I and Q yields a measure of the amplitude of the beat tone, which can be utilized for active polarization control and spectral broadening waveform alignment.

The per-channel phase estimate is valid for any phase relationship over the full ±π angular range and is independent of the other channels in the array. A frequency shift of $\omega_o$ can support a phase measurement bandwidth of up to $\omega_o$ with a photodetector 127 and electronics 128 capable of operating at a frequency band centered at $\omega_o$ with a width of twice the measurement bandwidth. Because the photodetection and subsequent signal-processing steps occur independently for each channel, the number of channels in the array has no impact on the per-channel sensing design or performance. This same scaling relationship also holds true for the polarization and broadening alignment sensing, resulting in a sensing architecture whose performance is not altered by the channel count of the system 100.

Phase Control

Each array channel has dedicated phase control electronics 131 (e.g., implemented in an FPGA) that can control the channel phase modulation used to compensate for channel phase errors. For optical phase control, each channel's control electronics 131 use the phase estimate $\hat{\phi}$ and other external inputs to calculate an appropriate phase correction and to synthesize the drive signal for the corresponding channel phase modulator 112 to achieve that correction. Each instance of the phase control electronics 131 operates independently on a single channel in the array, with one instance per channel. Each instance of the phase control electronics 131 or control electronics module operates independently, without any coordination with other channels. This independent and simultaneous operation allows the control electronics modules 131 to control some number of channels within arrays of arbitrary size without any impact to the per-channel computational resources necessary or per-channel performance.

The primary external input to each control electronics module 131 is the desired phase relationship between the channel and the common reference, denoted as the phase target. The control electronics 131 drive the phase modulator 112 such that the measured phase estimate $\hat{\phi}$ is driven to this target value. The phase target is formed from the summation of one or more components, each of which may be held constant or updated as frequently as necessary for the application. The summation of the components is represented as an angle in the range of ±π radians.

A first component of the phase target is the desired phase offset of the channel relative to the rest of the array at the exit aperture of the system. This relative phase offset sets the far-field wavefront of the coherent beam combining system. For example, the wavefront could be a flat wavefront or a rastered or repeating tip/tilt/focus pattern for scanning. The wavefront could follow an open-loop time sequence-like focus for drilling or machining. Or the wavefront could also be something calculated based on sensor feedback, like such as feedback from a wavefront sensor quantifying free space optical distortion.

The desired wavefront may be decomposed into Zernike modes (e.g., tip/tilt/focus, as shown at right in FIG. 5), with each mode having a coefficient that quantifies how much of that mode to apply to the phase component. The Zernike polynomials describe the shape of the Zernike modes, so for each channel (at a particular x,y location within the optical array 116), the corresponding control electronics module uses the Zernike polynomials to calculate the direction and magnitude of the phase change for each mode. These values can be calculated ahead of time for each channel, scaled by the Zernike coefficients, and summed to get the phase change for that channel. This is scalable because the per-channel computation is distributed. High-speed wavefront manipulation can be achieved by frequently updating the Zernike polynomial coefficients broadcast to the elements in the array.

A second component of the phase target is an offset that accounts for the difference between the measured phase estimate and the true phase of the beam from that element at the exit aperture of the system. In other words, the second component of the phase target accounts for unwanted differences between the measured and desired phases of the corresponding output. These biases or errors may result from wavefront features in the reference beam, non-idealities in the beam sampling plane or the combination plane, or from the contribution of any optical components between the beam sampler and the exit aperture. Because known biases of any magnitude can be easily trimmed on a per-channel basis, the control system can accommodate significant static optical non-idealities. Dynamic biases can be trimmed out to the extent that they can be predicted or observed during operation.

This control architecture may be incorporated into systems that employ additional higher-level external feedback loops, such as optimization processes which maximize performance metrics sensed downstream of the HICCORI beam sampler. An external feedback loop may include additional sensors that make downstream measurements of the beam shape and then feed commands to the HICCORI system in the form of phase offsets or Zernike coefficients to generate a desired beam shape. If the HICCORI system is used for laser cutting or machining, for example, a camera can observe the size and location of the spot on the work piece. An external feedback loop can use the camera sensor data to determine position and focus errors of the cutting beam and then command tip/tilt/focus changes to the HICCORI system to correct the errors. In other examples, the external feedback loop may control the optical power delivered by the HICCORI system to a target as measured by observing the back-reflection or, for free-space optical communications, the received signal power or bit-error rate.

External loops that rely on dithers or other trial-and-error hill-climbing approaches can be readily accommodated by including a third component in the phase target. This third component can allow an external feedback loop to apply dithers and offsets as desired, either on a per-channel basis or globally in terms of a Zernike polynomial. Because the HICCORI phase controller includes both feedback and feed-forward paths, the dithers that are injected in the phase target input are passed through to the phase control components regardless of their frequencies, and the feedback loop should not attenuate these expected phase changes. For example, the HICCORI control architecture may be employed to provide high bandwidth control of a many-channel optical phased array to suppress environmental disturbances, such vibration and thermal changes that impose phase disturbances within the HICCORI system (predominantly in the fiber within the amplifiers). The HICCORI system can attenuate these phase disturbances with its high-bandwidth, per-channel loops. This optical phased array may be integrated into a system which includes additional components and sensors.

The HICCORI architecture can simultaneously provide high bandwidth rejection of internal disturbances and also act as a "black box" actuator as a component of a larger system. (The entire HICCORI system is like a black-box deformable mirror, with Zernike coefficient command coming in and a stable desired wavefront going out.) The HICCORI command inputs, such as the per-channel phase offset and the Zernike polynomial input, facilitate the ability of the integrated system to implement additional control loops with feedback from additional sources. This can be utilized to facilitate wavefront stabilization and compensation when the beams propagate along optical paths that are affected by dynamic disturbances. For example, an optical phased array communication system may utilize the signal to noise ratio (SNR) reported by a receiver as a performance metric.

Once the three components of the phase target have been calculated and summed to produce the net phase target input to the phase control electronics 131, the phase control electronics 131 perform three more calculations to determine the signal for driving the phase modulator 112: (1) a feedforward phase-update calculation (shown in FIG. 2 as feedforward path 224), (2) a feedback phase-update calculation (shown in FIG. 2 as feedback path 223), and (3) the synthesis of the phase modulator drive signal. The feedforward phase-update calculation is an open-loop calculation to alter the channel phase directly in correspondence with changes in the commanded phase target. It changes the actuator voltage by an amount that is expected to result in the commanded change, regardless of any feedback measurement (e.g., if the phase target is increased by $\pi$, the actuator voltage changes by an amount that ought to produce a $\pi$ change in phase). The closed-loop feedback calculation derives a channel phase update from the calculated phase error. The phase error is found as the angular difference between the current measured phase estimate and the expected value, which is an appropriately delayed version of the commanded phase target. The result of the feedback calculation is a phase value that should reduce the error signal to zero. The feedback phase update may be proportional to the error signal or may be produced from a more complex calculation, so long as the desired feedback loop stability criteria (e.g., gain margin and phase margin) are met and the loop remains stable.

The net phase update is the combination of the output of the feedforward and feedback calculations represented as an angular rate or incremental change in the range of $\pm\pi$ radians. The phase modulator drive signal is synthesized by propagating the current state of the modulator by the net phase update. For phase modulators with a finite actuation range, a discontinuity of some multiple of $2\pi$ radians can be injected as appropriate to prevent saturation and to jump quickly to an equivalent state within the actuators operating range.

The phase target and its components, phase error, and net phase update can be represented as fixed-point digital numbers with a scale factor and number of bits appropriate for the application. By choosing a scaling such that the most significant bit (msb) has a weighting of $\pi$ radians, these digital numbers can represent phase values ranging from $-\pi$ (inclusive) to $+\pi$ (exclusive). For addition and subtraction operations, integer roll over can be leveraged to ensure the calculated result is represented as an equivalent angle within this range by effectively adding or subtracting precisely $2\pi$ as the digital representation of the result rolls over. For example, if the sum of the three components of the phase target were to exceed the representable range (e.g., $+3\pi/2$), the digital number representing their sum automatically wraps around to the corresponding representable value (here, $-\pi/2$). Likewise, subtracting the phase estimate from the phase target should always result in an error signal wrapped to within the representable range, ensuring the systems is driven along the shortest path from the existing phase to the desired phase.

The fixed-point representation of phase and the associated mathematics offer distinct advantage over legacy systems which may encode these signals as analog voltages or otherwise bounded quantities. With analog voltages each individual signal and each combination must be managed to avoid saturation at the extremes of the working range. Discontinuities imparted to manage analog signals within some ranges are not instantaneous and their transitions can affect downstream processing. By contrast, the fixed-point digital representation and mathematics described herein allow each phase target component to be independently advanced or retarded indefinitely without concern for saturation or discontinuity. The phase estimate can likewise track this input smoothly across numeric roll over events without any discontinuities imparted on the error signal and without any loss of phase control performance.

Broadening Waveform Alignment and Polarization Control

Each channel beam can be modulated with a broadening waveform to suppress or prevent stimulated Brillouin scattering caused the (amplified) array beam as it propagates through optical fiber. This broadening waveform can be a GHz-bandwidth pseudo-random bit sequence (PRBS), white noise, or other suitable waveform that increases the linewidth of the channel beams to reduce the probability of nonlinear interactions between the channel beams and the optical fiber.

While the phase of the heterodyne beat tone may be utilized to support high bandwidth active phase control, the amplitude of the tone (e.g., the Euclidean norm of the filtered I and Q components) may be utilized to support the active control of broadening waveform alignment and polarization state of each channel with respect to the reference beam. By driving each channel to a desired relationship relative to the common reference, the channels can be made to maintain a desired relationship with all other channels in the array. This makes it possible to manipulate the coherent combination of the channel beams as they propagate.

The amplitude of the beat tone is maximized when the channel beam and the reference beam have the same polarization state and their respective broadening waveforms are precisely aligned in time as the beams are coherently combined at the combination plane 125. Waveform alignment can be described as a single degree of freedom in which the channel beam waveform can be advanced or retarded in time relative to the reference beam waveform. The polarization states of the channel and the reference can be represented as respective points on the surface of the Poincarésphere. The separation of these points can be described in terms of two orthogonal components, or two degrees of freedom. The beat tone amplitude may be utilized to control all three of these degrees of freedom (pattern alignment and the two orthogonal components describing the difference in the polarization states).

Broadening waveform alignment and polarization control may be implemented with pattern control components 140 and polarization control components 150, respectively. The waveform control components 140 include one set of broadening waveform adjustment electronics 141 and broadening waveform alignment estimation electronics 143 per channel along with an RF source 142 for dithering the broadening waveform modulated onto the heterodyne reference 124 with the waveform generator 144 and broadening waveform phase modulator 104. In operation, the broadening waveform alignment estimation electronics 143 estimate the temporal misalignment, if any, between the waveform modulated onto the channel beam and the broadening waveform modulated onto the reference beam 124. The broadening waveform adjustment electronics 141 compare this alignment estimate to a desired alignment trim, or temporal offset, to shift the broadening waveform modulated onto the channel beam by the corresponding phase modulator 113 backward or forward in time to compensate for any undesired broadening waveform misalignment. The channel beam can also be shifted in time with respect to the reference 124 using a variable optical delay line or other optical element.

In a practical implementation, the FPGA can perform the calculations to determine the desired broadening waveform shifts (alignment estimation, trim calculations, feed-forward and feed-back calculations etc.), then command an offset to a standalone circuit that generates the broadening waveform and drive the modulator.)

Similarly, the polarization control components 150 include one set of polarization state estimation and compensation electronics 151 per channel. Each set of electronics 151 independently actuates each channel's polarization state to match a reference polarization state using a corresponding automated polarization controller 114. The electronics 151 do this by maximizing the amplitude of the channel photodetector output; this amplitude depends on how well the channel beam's polarization state matches the reference beam's polarization state, which is controlled with a polarization actuator 123 to match the reference polarization state.

The broadening waveform/pattern alignment and polarization can be controlled in any of several manners, including incremental hill-climbing methods. In an incremental hill-climbing method, each of the three degrees of freedom (i.e., the broadening waveform/pattern alignment and the two polarization axes), either individually or in various combinations, are periodically incremented by some amount and the effect on the amplitude is evaluated. Incremental changes that increase the amplitude are favored, and incremental changes that reduce the amplitude are suppressed.

Another method is to periodically dither each degree of freedom, either individually or in various combinations, by some amount in each direction (e.g., in a positive sense and subsequently in a negative sense). By observing the effect on the amplitude over one or more dither cycles, the error along each degree of freedom can be estimated and appropriate control action can be applied.

Both the incremental hill-climbing and dither methods utilize a single feedback signal, the beat tone amplitude, for control of three degrees of freedom by time-division or code-division multiplexing the degrees of freedom. Controlling three degrees of freedom with one feedback signal involves some level of timing coordination.

A third method of controlling polarization and broadening waveform alignment, which may be described as frequency division multiplexing, is to vary each degree of freedom with a waveform that occupies a limited frequency band, e.g., a sinusoid. By sufficiently separating the waveforms in frequency, the fluctuations in the beat tone amplitude may be demodulated by each of the waveforms and appropriately filtered to yield an estimate of the alignment error along the corresponding degree of freedom.

In a typical tiled optical phased array system, hill-climbing increments, dithers, and sinusoidal frequency tags can create discrepancies among the channel beams themselves, degrading the optical output. For this reason, the amplitude of these changes should be kept relatively small. In the HICCORI architecture, the three degrees of freedom relating each channel beam to the common reference beam may be manipulated by altering the channel, the reference, or some combination thereof. In the HICCORI architecture there is no degradation in the optical output when the reference beam is manipulated by itself or when all the channels in the array are manipulated in a consistent manner.

In a practical implementation, achieving a desired reference beam polarization state and/or polarization modulation pattern may require continual measurement of the reference beam polarization and active feedback control. In this case, as shown in FIG. 1B, a beam splitter 161 may be employed to sample the reference beam 124 in free space upstream of the combination plane 125 and direct some portion of the optical energy into some suite of polarization measurement components 162. Any combination of sensors typically employed to measure polarization may be utilized, including polarizing beam splitters, photodetectors, rotating waveplate polarimeters, etc. The reference beam polarization state may also be measured relative to an additional independent free space beam serving as a polarization reference by monitoring the amplitude fluctuations of a heterodyne beat tone.

Example HICCORI Phase Control Implementation

Figure 2:
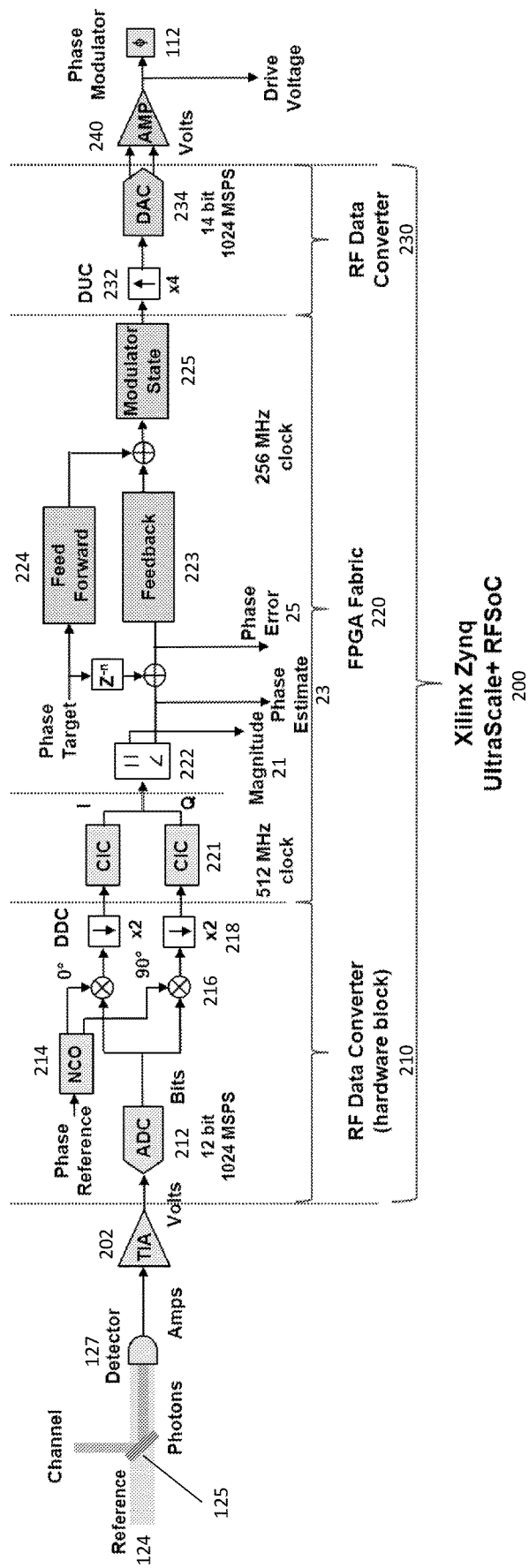
FIG. 2 shows Xilinx ZCU111 field-programmable gate array (FPGA) based implementation of the HICCORI sensing and control architecture.

FIG. 2 shows a digital implementation of the per-channel sensor processing and control for phase control described above. This example uses an optical reference frequency shift $\omega_o$ of 25.6 MHz, supports a phase measurement bandwidth in excess of 1 MHz, and has a phase control feedback loop unity gain crossover at 100 kHz. It demonstrates many aspects of the control architecture, including the ability to scale to high(er) channel counts without reduction in per-channel performance. Other implementations may differ from this example implementation depending on the application, operating environment, cost, and/or level of integration with other systems.

In particular, the HICCORI implementation shown in FIG. 2 includes Xilinx ZCU111 development boards 128 that sense and control the phases of the beams emitted by the elements in the phased array/coherent beam combining system 100 of FIG. 1A. Each ZCU111 board 128 is based on a Xilinx Zynq UltraScale+RF System on Chip (RFSoC), which incorporates an input RF data converter (RFDC) 210, FPGA 220, multi-core ARM processor, and output RFDC 230 into a single package 200. One advantage of using the RFSoC for prototyping is the ability to rapidly implement desired sensing and control process digitally with commercial off-the-shelf (COTS) hardware.

Each channel has a dedicated photodetector 127 which, given a heterodyne beat frequency $\omega_o$ of 25.6 MHz and a 1 MHz measurement bandwidth, only needs to support the frequency range from 24.6 to 26.6 MHz. A wide variety of commercially available photodetectors with even better performance are readily available; were utilized in building example systems, including an 8×8 element avalanche photodiode (APD) array, fiber-coupled amplified PIN diodes, and discrete amplified photodetectors. In one configuration, ThorLabs PDA05CF2 InGaAs amplified photodetectors 127 were utilized with DC blocks, attenuators, and transimpedance amplifiers 202 to convert photocurrent generated by the photodetectors 127 into a voltage suitable for interfacing with the ZCU111/XM500 breakout board "low frequency" single-ended analog-to-digital converter (ADC) input ports 212.

The input RFDC 210 includes an ADC 212, numerically controlled oscillator (NCO) 214, mixers 216, and digital down converters (DDCs) 218. The ADC 212 converts the analog voltage from the transimpedance amplifier 202 into a digital voltage suitable for I/Q demodulation and decimation with the NCO 214, mixers 216, and DDCs 218. In this example, the ADC sample rate is 1024 MHz, which is 40 times the AOM frequency shift $\omega_o$. I/Q demodulation is performed within the RFDC hardware by digitally synthesizing the appropriate sinusoidal waveforms with the NCO 214 and computing the results of the mixing operations at the full 1024 MHz sample rate. The DDCs 218 in the input RFDC 210 are configured to filter and down sample by a factor of two. An interface between the input RFDC 210 and the FPGA fabric 220 clocks individual I/Q sample pairs into the FPGA 220 at 512 MHz to reduce latency. (Other sampling rates, down-sampling factors, and clock rates are also possible.)

The sinusoidal waveforms generated in the input RFDC 210 for demodulation should maintain a fixed phase alignment relative to the drive signal for the AOM 122 (FIG. 1) during operation. In the implementation shown in FIGS. 1 and 2, this is achieved by utilizing a two-channel function generator 121 (FIG. 1; e.g., an Agilent 33522A function generator) to synthesize two waveforms, both derived from a single internal crystal oscillator, which have a fixed phase and frequency relationship. One output is configured to produce a 25.6 MHz sinusoidal waveform which directly drives the reference channel AOM 122 (e.g., a Brimrose AMF-25-1640-2FP AOM). The other output is configured to produce a 12.8 MHz square wave, which is distributed to the ZCU111 board(s) 200 and serves as a frequency and phase reference. The ZCU111 includes hardware phase lock loops (PLLs), which are configured to lock to the 12.8 MHz reference and to generate the individual clocks for the RFSoC's ADC 212, NCO 214, FPGA 220, and digital-to-analog converter (DAC) 234. It is possible to utilize a rising or falling edge of the 12.8 MHz waveform to initialize the NCO internal phase deterministically on system startup. Alternatively, it is also possible to allow the NCO 214 to initialize with a random fixed phase offset and then to trim the phase target command accordingly.

One method of determining the NCO offsets and corresponding trim values is to employ a self-calibration procedure after system power up in which all channels simultaneously measure the apparent phase of a known wavefront. FIG. 1B shows a self-calibration beam 163 being combined with the reference beam 124 at plane 164 such that the combination of the two beams falls on the entire array of detectors 127. With the channel beams disabled and no light emitted from the optical array 116, the phase observed at each channel consists of an offset component common across the entire array, a component due to the known wave front, and a component due to the channels NCO phase offset. By simultaneously observing the measured phase of all channels and subtracting a pre-determined component due to the known wavefront, the desired per-channel NCO trim values can be obtained. After the trim values have been determined, the self-calibration beam 163 can be disabled, and the channel beams can be enabled for normal operation.

In the FPGA fabric 220, the I and Q signals pass through cyclic integrator-comb (CIC) decimation filters 221, which retain low frequency content (DC to $\omega_o$), block the higher harmonics, and decimate the 512 MHz input to a 256 MHz output. The FPGA 220 uses a COordinate Rotation DIgital Computer (CORDIC) block 222 to calculate a phase estimate 23 to support phase control and to quantify the magnitude 21 of the beat tone, which may be utilized to support active broadening waveform alignment and polarization control. The phase estimate 23 and the phase target angles are stored and processed digitally in a signed fixed-point representation with a full-scale range of $\pm\pi$. Calculations take advantage of integer rollover to efficiently wrap the results of sums and differences back into the $\pm\pi$ range.

The phase error 25, which supports closed-loop feedback control, is calculated by subtracting the measured phase estimate 23 from the expected channel phase. The expected channel phase is the commanded phase target delayed by the time necessary for signals to propagate through the entire loop. For example, when a change is applied to the commanded phase target, it may take some number of 256 MHz clock cycles for that change to propagate through a feedforward path 224, to the phase modulator 112, through the fiber and free space optical paths, and eventually result in a change in the measured phase estimate. By delaying the phase target appropriately prior to comparison with the phase estimate, the phase error 25 captures only the deviations from expectation. To accommodate channel to channel variations in propagation time, for example, due to differing fiber lengths, the delay is implemented in an adjustable manner. In one example, a 64-cycle fixed delay is followed by a 256-tap delay line, allowing a delay ranging from 250 nanoseconds to 1250 nanoseconds to be selected via a control register.

The feedforward phase update calculation can be implemented as the difference between the current phase target and the phase target from the previous 256 MHz cycle. In the feedback path 223, the angular error can be scaled by a configurable gain to obtain a phase update. The phase updates from the feedforward path 224 and feedback path 223 are then combined to form the net phase update within the $\pm\pi$ range. The phase modulator state 225, which is propagated by the net phase update on each 256 MHz cycle, is stored in a fixed-point representation that can accommodate values over $\pm 8\pi$. To prevent overflow of the stored modulator state and to prevent saturation of the modulator drive circuitry, a jump of $6\pi$ towards zero is injected whenever the absolute value of the state exceeds $5\pi$.

The system in FIG. 2 includes iXblue Photonics NIR-MPX-LN-0.1 lithium niobate (LiNbO$_3$) phase modulators 112 with a customized drive circuit for electrical connection to the ZCU111/XM500 breakout board 128 unfiltered differential digital-to-analog converter (DAC) 234 outputs. The relationship between the DAC command to the achieved phase actuation is treated as a single linear scale factor. In the FPGA 220, a configurable gain is set to the inverse of this value to calculate the required DAC command from the computed desired phase modulator angular state. The DAC command is calculated in the FPGA 220 and clocked into the RFDC sub-system at 256 MHz. The output RFDC 230 include a digital upconverter (DUC) 232 configured to up-sample the DAC command by a factor of four to the 1024 MHz DAC update rate.

Figure 3:
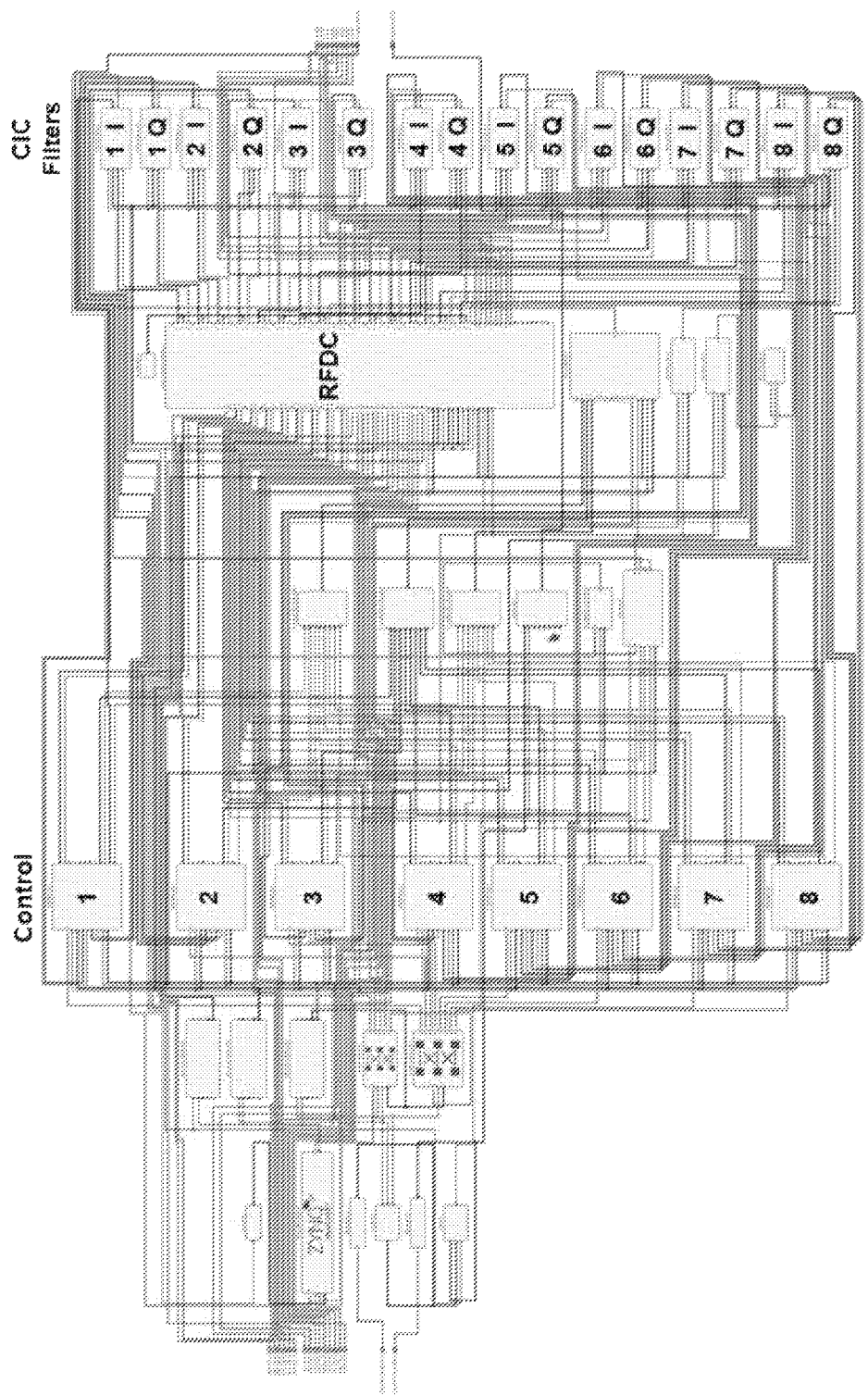
FIG. 3 shows an eight-channel ZCU111 FPGA block diagram.
Figure 4:
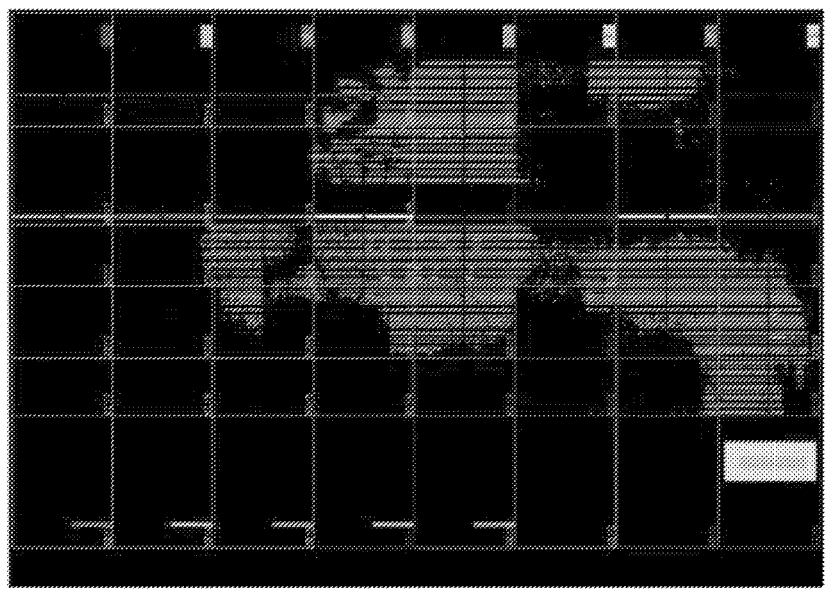
FIG. 4 shows resource utilization of an eight-channel ZCU111 FPGA when configured for phase control (polarization and broadening waveform control are also possible).
Figure 4:
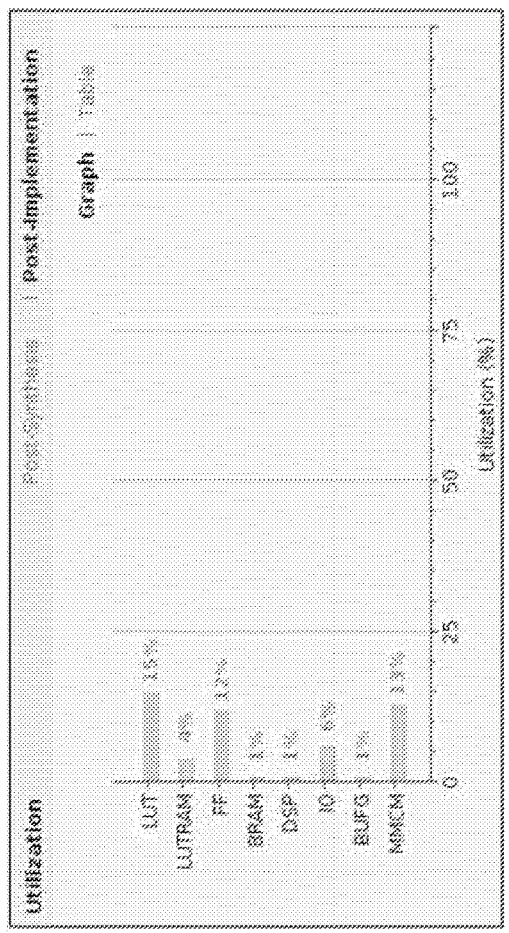

The control architecture shown in FIG. 2 scales to high channel counts through the replication of the single channel control resources to achieve simultaneous independent control of each channel with respect to the common reference. This capability can be demonstrated at two levels of integration. As shown in FIG. 3, eight channels are supported by each ZCU111-based control module. Multiple control modules can be utilized in parallel to control a single optical array. At the module level, the ZCU111 is based on a Zynq RFSoC part with an RFDC subsystem containing eight ADC/DAC pairs, which limits the module to control of eight channels, though other commercially available RFSoC devices can support up to sixteen channels. In the FPGA, the implemented control processes use modest resources as shown, and an eight-channel implementation utilizes no more than 15% of any single resource category as shown at left in the Utilization Summary Graph in FIG. 4. The right side of FIG. 4 shows the implemented device (FPGA), with black areas representing unutilized resources in the FPGA.

Scaling to very high channel counts can be achieved by using numerous modules in parallel, with each module controlling a subset of the total number of channels in the array. As implemented in FIG. 2, the only signal that is distributed to each module in the system is the 12.8 MHz phase and frequency reference. Feeding this distributed signal through one or more hardware phased-locked loops on each module provides the opportunity to condition this signal and relaxes the requirements on the replication and distribution of an analog signal to many endpoints. There is also no strict requirement for delay matching as any difference in the time of arrival of the signal at each module can be easily trimmed via the phase target command for each channel.

At the ZCU111 module level, real-time software executing in the RFSoC ARM processor can support configuration, commanding, and monitoring of up to sixteen channels per module. The software establishes an external data interface over which command and configuration packets may be received and monitoring data may be sent. Module specific configuration packets are parsed, and the values for each configurable parameter are pushed to the appropriate FPGA registers for each channel. Configuration information specifying the normalized XY location of each element (emitter) served by the module is stored in software and utilized to evaluate Zernike polynomials broadcast to all modules in the array. The phase angles computed from evaluation of the Zernike polynomial at each channel location are combined with the corresponding per-channel phase offsets received in a module specific command packet. The resulting net angle for each channel is pushed to the FPGA as the commanded phase target.

TCP/IP sockets over Ethernet are utilized for the data interface between the ZCU111-based modules and computer systems performing array-level command and control of multiple modules. Ethernet is suitable for the laboratory, though dedicated high-speed serial links may be preferred in an embedded implementation to achieve more deterministic packet timing. At the array management level, Matlab scripts running on a computer can formulate and send the packets with channel specific configuration and command data to individual modules on an as-desired basis.

Figure 5:
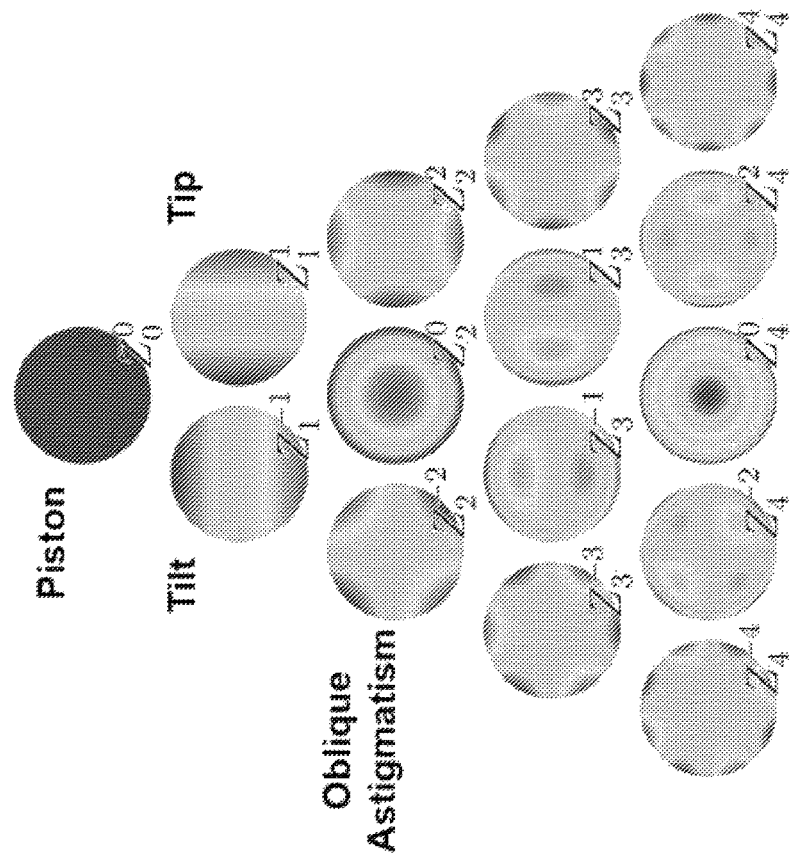
FIG. 5 shows SpaceMouse user input device axis mapping to Zernike modes.
Figure 5:
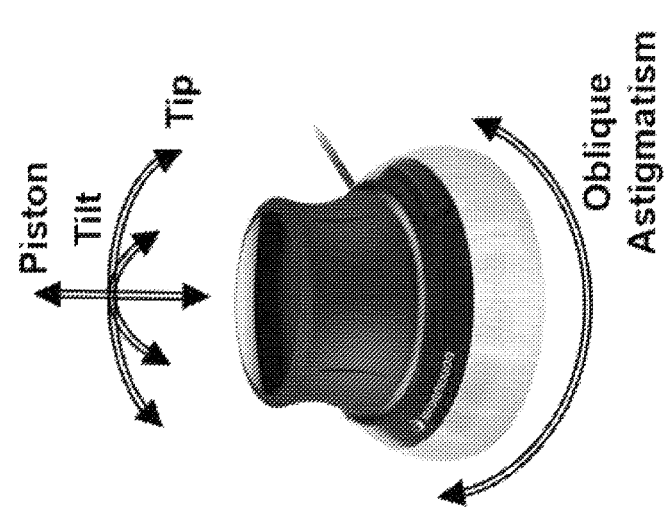

Zernike polynomial broadcast messages were utilized in laboratory demonstration to provide an operator live interactive commanding of all channels across multiple modules. A software application reads the state of a 3dConnexion SpaceMouse input device and formulates and sends Zernike polynomial broadcast packets to the control modules at a rate of 100 Hz. FIG. 5 shows the mapping between the SpaceMouse axes (left) and the Zernike modes (right).

Figure 6:
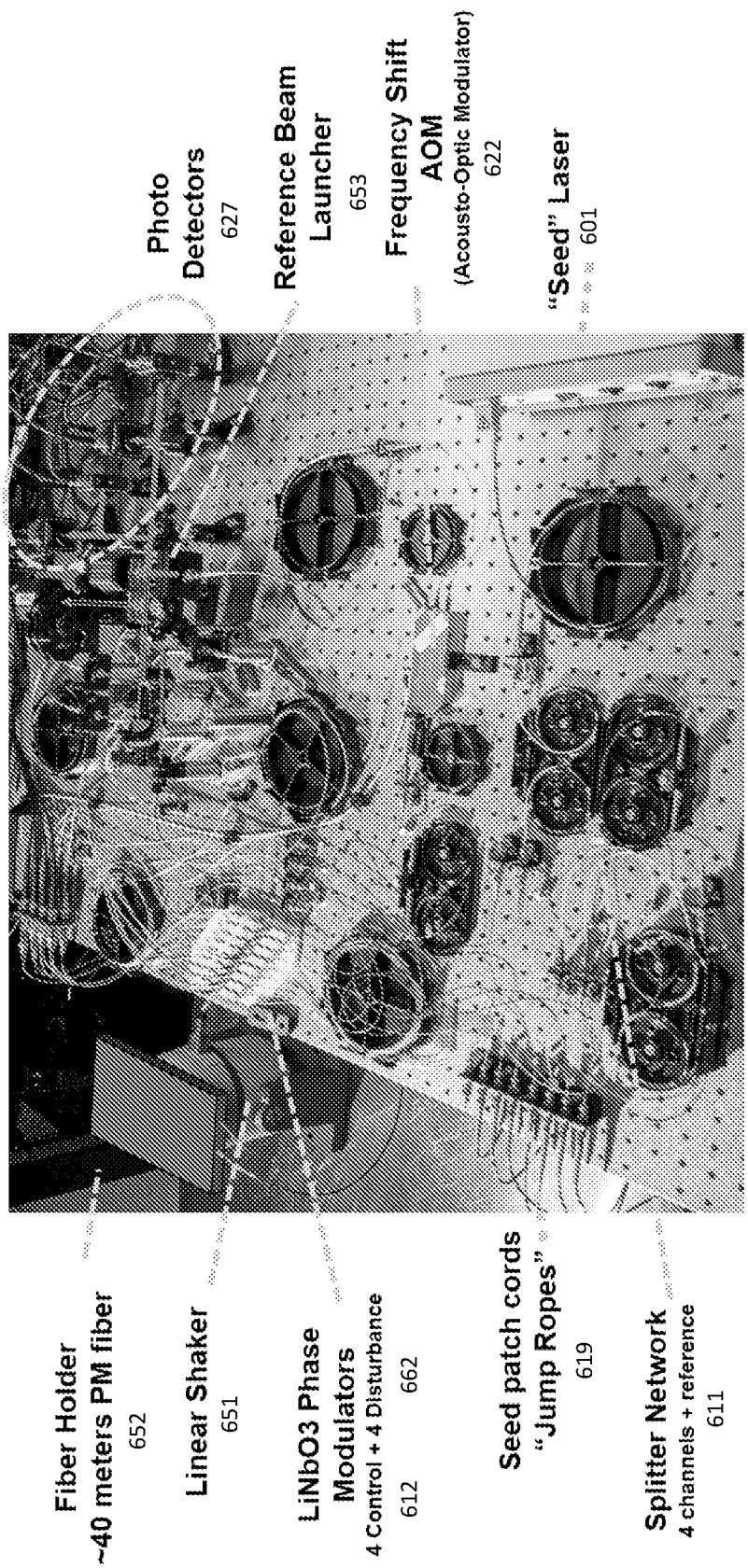
FIG. 6 shows a four-channel optical system for phase control demonstration and testing.
Figure 7:
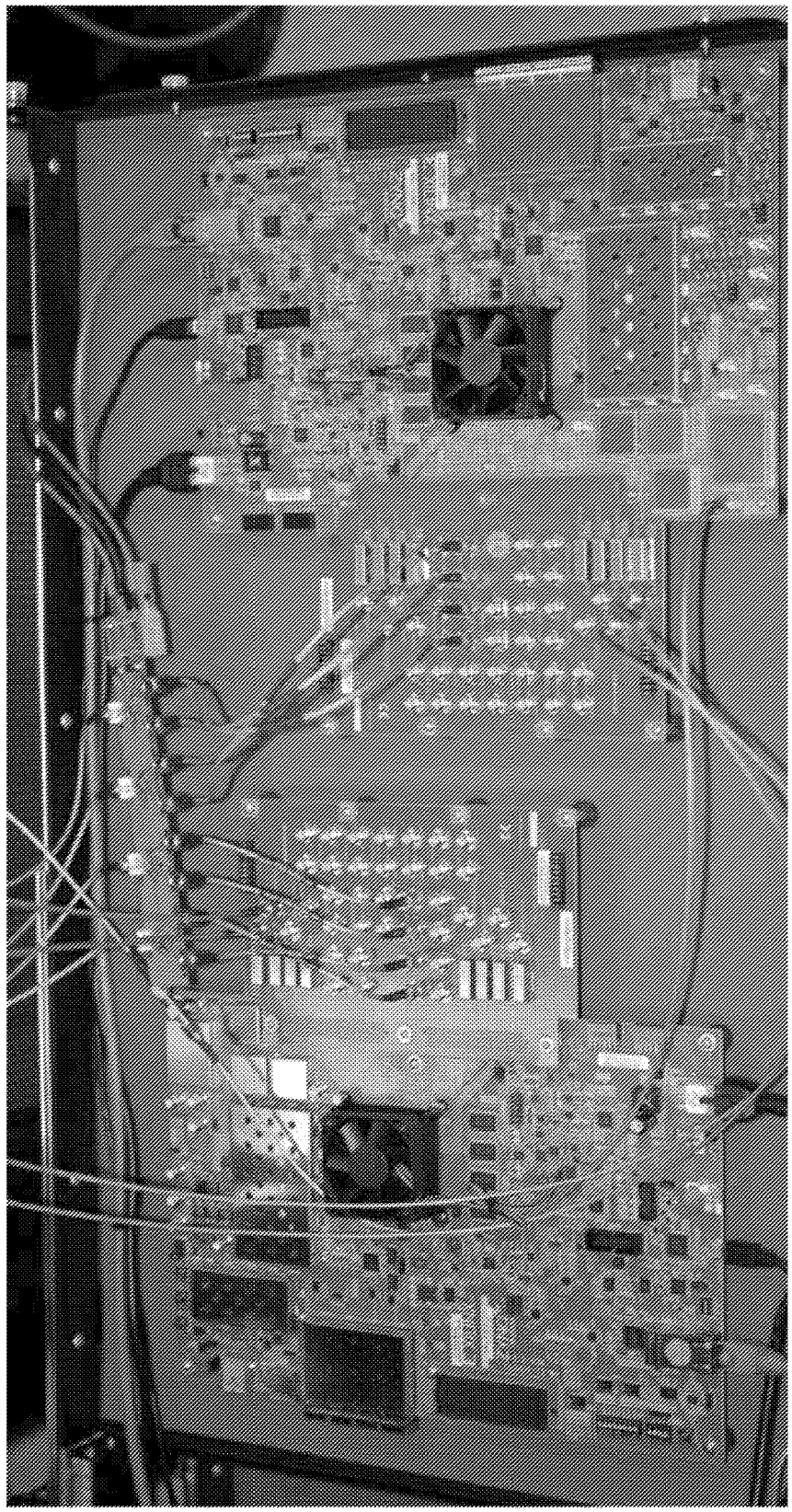
FIG. 7 shows two separate ZCU111-based FPGA control modules, each controlling two channels in a phased array.

FIGS. 6 and 7 are photographs of the optics and electronics, respectively, in a four-channel coherent beam combining system emulator. FIG. 6 shows the four-channel optical system, which includes a 2×2 tiled phased array used to demonstrate phase control aspects of the architecture and implementation shown in FIG. 2. To reduce unnecessary complexity, the optical system operated at low power levels. It was constructed with polarization maintaining components to eliminate the need for active polarization control and utilized a narrow-linewidth seed laser 601 to mitigate possible path-length mismatch.

FIG. 7 shows two ZCU111 modules, each controlling two channels in the four-channel optical system. This demonstrated the ability to scale to large channel count arrays with coordinated control of multiple modules. The 2×2 array geometry allows for demonstration of wavefront manipulation via both the tip and tilt Zernike coefficients.

The ZCU111 modules are synchronized to the same 12.8 MHz clock. Each module uses its own phase-locked loops (PLLs) to generate NCO demodulation frequencies, etc., which are frequency- and phase-locked across the module. This prevents the phases and frequencies of the modules' internal signals from drifting relative to each other.

The ZCU111 modules also receive the same Zernike coefficients for controlling the wavefront of system output. Each module calculates the phase change for each channel independently. This independent channel control produces a coordinated global wavefront change as described above: for example, when steering the beam with a SpaceMouse like the one shown in FIG. 5, the two ZCU111 modules impart the phase changes on each of the four beams (two beams each) to achieve the desired tip/tilt change.

As shown in FIG. 6, a fiber-optic splitter network 611 splits the output of the laser source 601 into four channel seeds and one reference seed. The reference seed was shifted by 25.6 MHz with an AOM 622, launched into free space with collimation optics 653, and expanded to form the reference beam. Each of the four channel seeds was routed through various lengths of fiber patch cord 619 hanging down the side of the optical table. These patch cords 619 were disturbed manually to provide phase perturbations. The seed for one channel was additionally routed through a housing wound with approximately 40 meters of passive PM fiber 652 and mounted on a linear shaker 651 capable of producing considerable vibrational disturbances.

After returning to the optical table, each channel was routed through a pair of phase modulators 612 and 662. The first phase modulator 6612 in each pair was driven by a ZCU111 module, shown in FIG. 7, for active phase control, and the second (identical) phase modulator 662 in each pair was driven by a standalone function generator for injecting controlled phase disturbances. The output of each channel was then launched into free space and collimated with a fiber-coupled collimator. A series of edge mirrors brought the four channel beams into a compact 2×2 pattern in free space. The array of channel beams then passed through a series of splitters, the first of which re-directs a portion of the light down an optical path where a camera imaged the far-field coherent combination of the four channel beams.

The light that passed directly through the first splitter in the series of splitters propagated to a second splitter where the reference beam was introduced. The combined reference and channel beams propagated to an arrangement of three 50/50 splitters, which were used to produce four identical outputs. An amplified photodetector 627 was placed at each output and translated such that its active area received light from a single channel interfering with the common reference.

Figure 8:
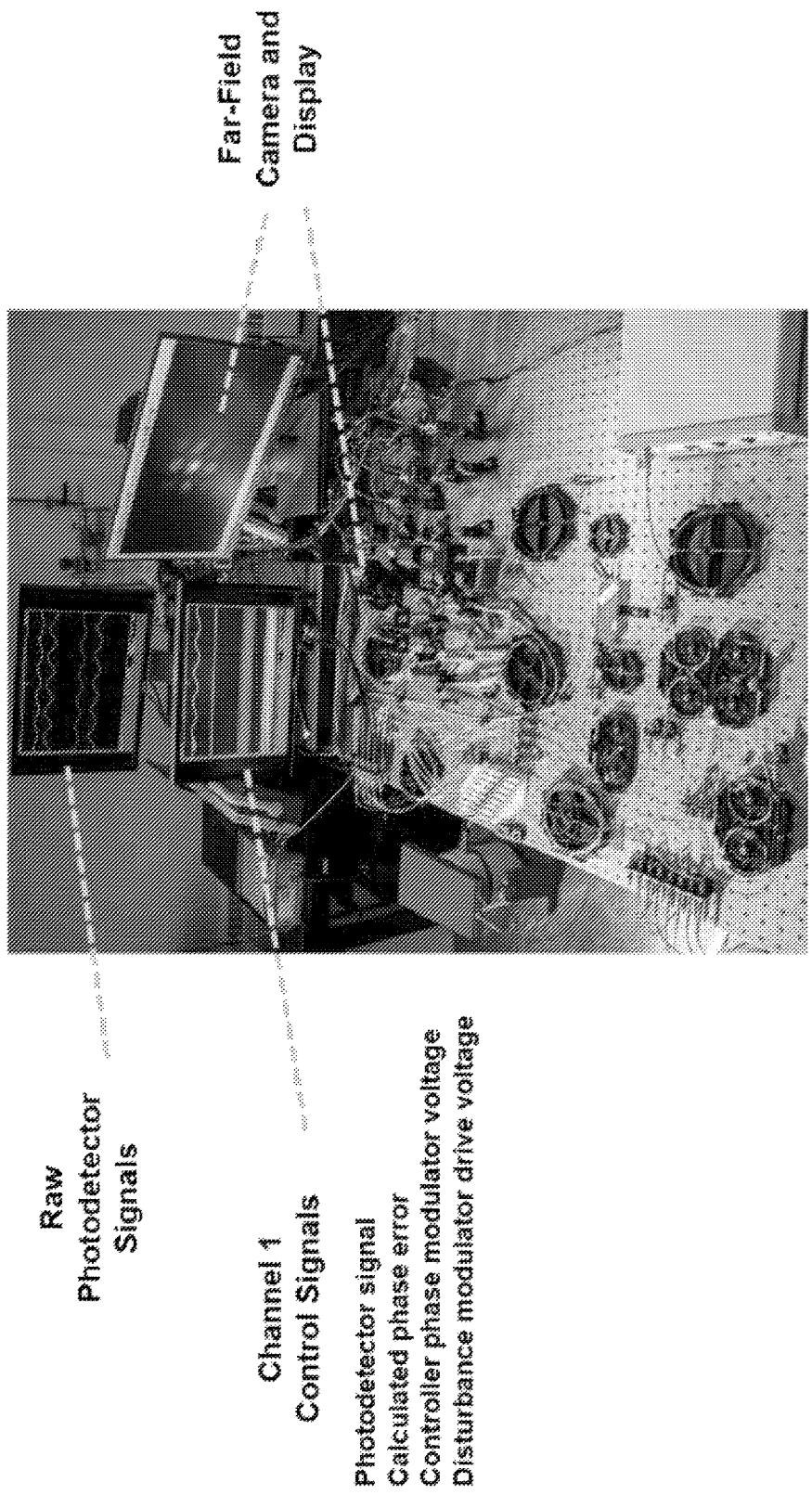
FIG. 8 shows the phased array emulator made of the four-channel optical system in FIG. 6 and the control modules in FIG. 7.

FIG. 8 shows the entire phased array emulator of FIGS. 6 and 7, including the optics and the control modules as well as monitors for selected signals. In particular, the monitors show the far-field array output, raw photodetector signals, and control signals. These control signals include the processed photodetector signals, calculated phase error, controller phase modulator voltage, and disturbance modulator drive voltage (i.e., the signal commanding the phase disturbance).

Demonstrated Phase Control Performance

A feedback control system should meet certain criteria to ensure stability of the feedback loop. Traditionally, the extent to which a feedback control system meets these criteria is quantified as gain margin and phase margin. In the implemented control system shown in FIGS. 6-8, the phase modulators, photodetectors, and electrical circuitry each had bandwidths much greater than the chosen loop crossover frequency of 100 kHz. The feedback loop dynamics should be dominated by the pure integrator in the digital algorithm and the phase loss associated with the delays in the system. Delay, or latency, in the feedback loop may be present due to the digital computation time as well as the time for light to propagate along the fiber and free-space path between the phase modulator and the photodetector.

Figure 9:
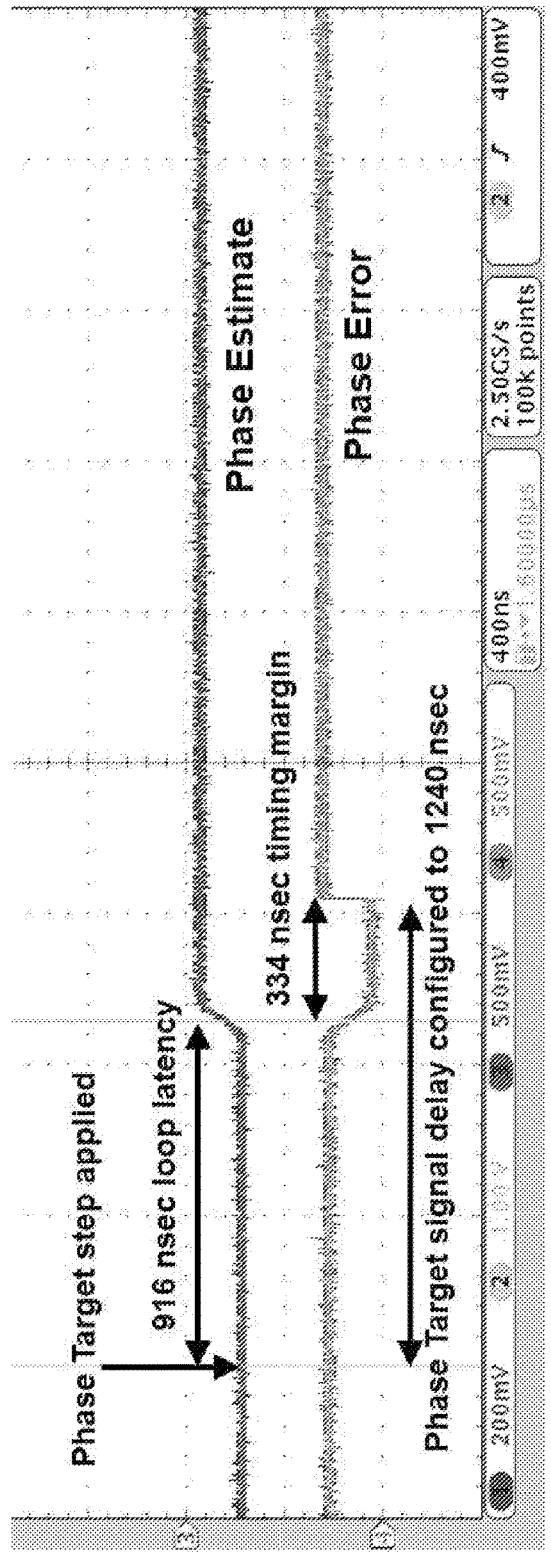
FIG. 9 shows loop latency measurement results.

Quantifying the delay in the implemented system and showing that sufficient timing margin exists to accommodate reasonable increases in path lengths is one measure of performance. To maintain a healthy 45 degrees of phase margin at 100 kHz, the maximum allowable latency in the loop should be about 1250 ns. The delay can be measured experimentally by introducing a step discontinuity in the commanded phase target and measuring the number of 256 MHz clock cycles that pass before the corresponding change in the measured phase estimate is observed. Using this method, the total loop latency in a test configuration was observed to be 916 ns as shown in FIG. 9. The 334 ns of timing margin should be sufficient to accommodate more than 65 meters of additional optical fiber.

A closed-loop feedback control system can actively reject disturbances. For linear systems, the ratio of the magnitude of the un-rejected portion of the disturbance (residual) relative to the magnitude of the disturbance as a function of frequency defines the disturbance transfer function. This relationship can be measured directly by injecting a controlled disturbance into the system at various frequencies and observing the control activity and un-rejected residual phase error.

Figure 10:
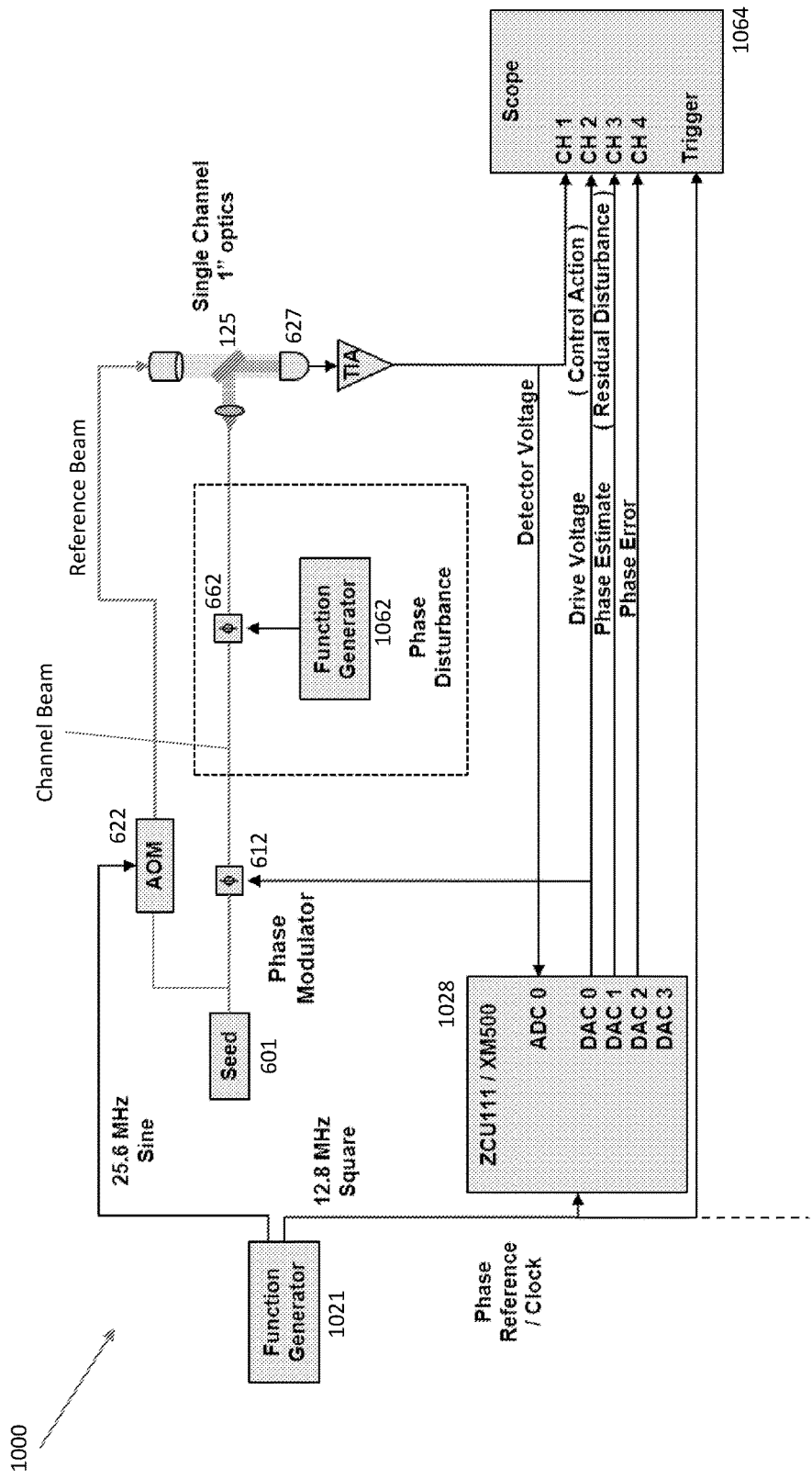
FIG. 10 shows a disturbance rejection verification configuration.

FIG. 10 shows a configuration for the emulator of FIGS. 6-8 in which the second phase modulator 662 in one array channel and a disturbance function generator 1062 were utilized to inject a known phase disturbance into the feedback loop. A reference function generator 1021 drove the reference beam AOM 622 with a 25.6 MHz sine wave and provided a 12.8 MHz square wave clock signal to an FPGA 1028 that controlled the phase of the channel beam via the phase modulator 612. The disturbance function generator 1062 modulated the phase imparted to one channel beam by the phase modulator 612 by a known phase disturbance. This produced a change in the interference between the reference beam and the channel beam that is sensed by the channel photodetector 627. The FPGA 1028 used the photodetector output correct the phase error as described above. An oscilloscope 1064 monitored the photodetector output, the drive voltage generated by the FPGA for the phase modulator 612 (control activity), the phase estimate (residual disturbance), and the phase error.

Figure 11:
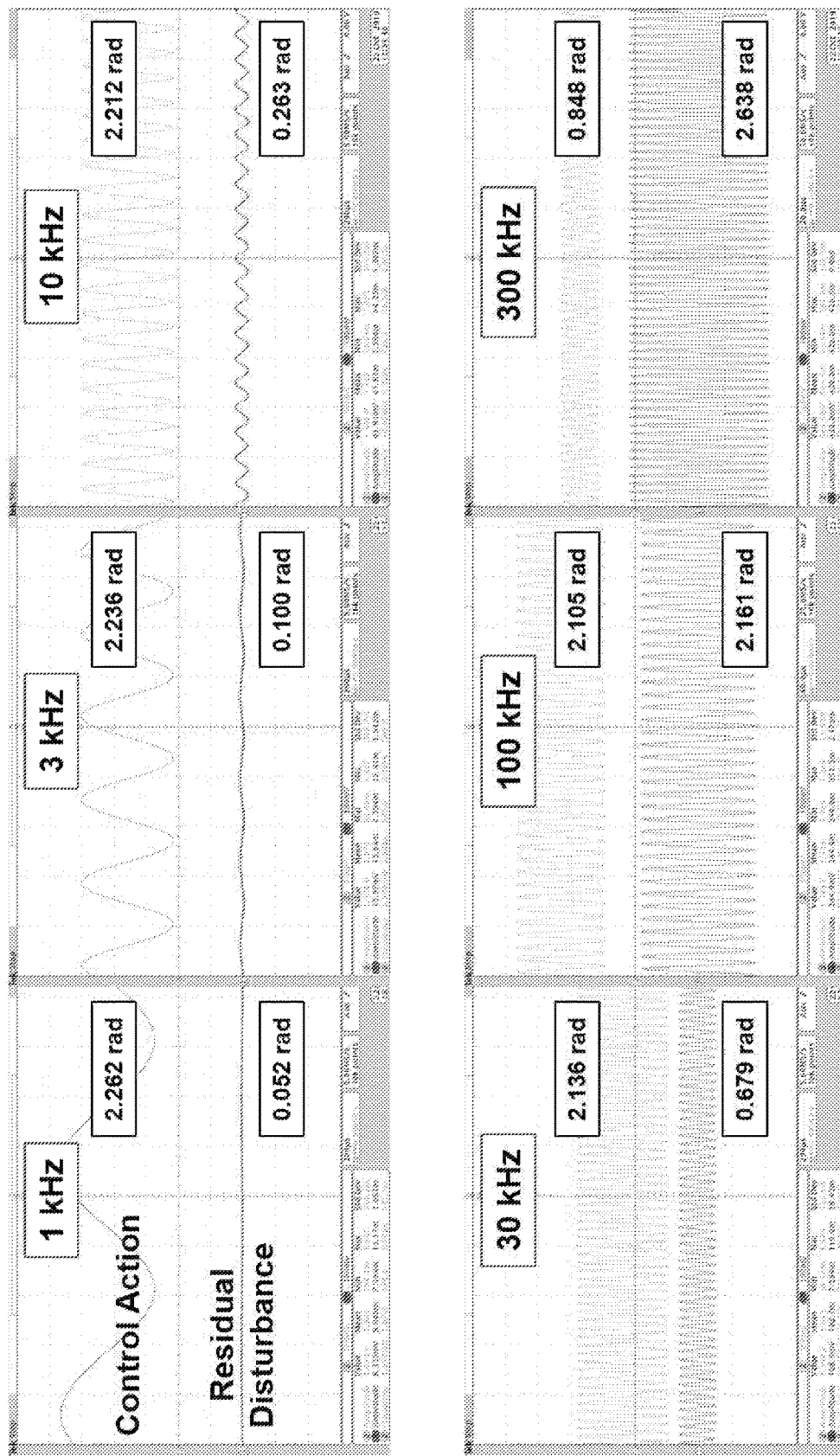
FIG. 11 shows disturbance rejection verification raw data.
Figure 12B:
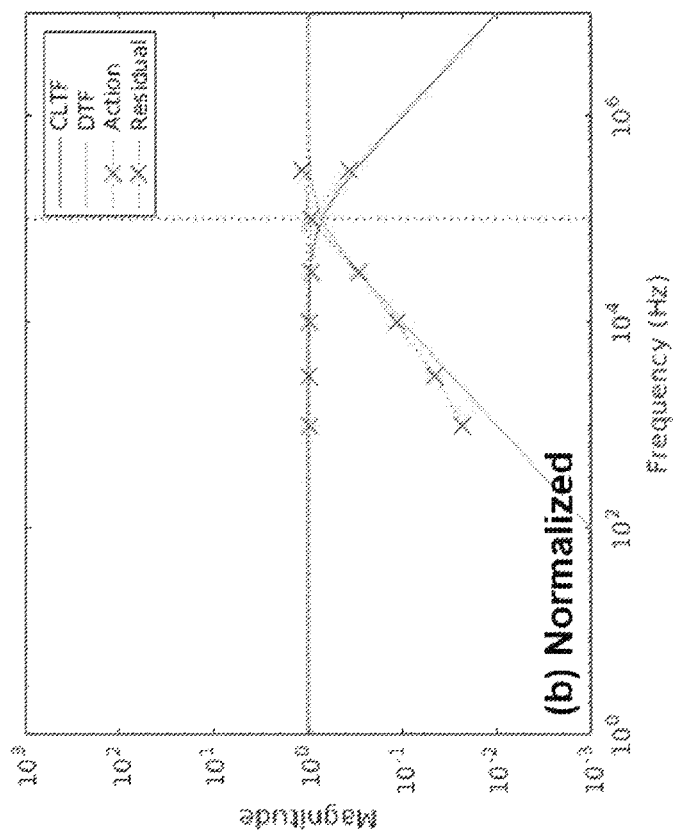
FIG. 12B shows the data of FIG. 12A normalized to disturbance amplitude and overlaid upon expected performance for 100 kHz crossover frequency.
Figure 12A:
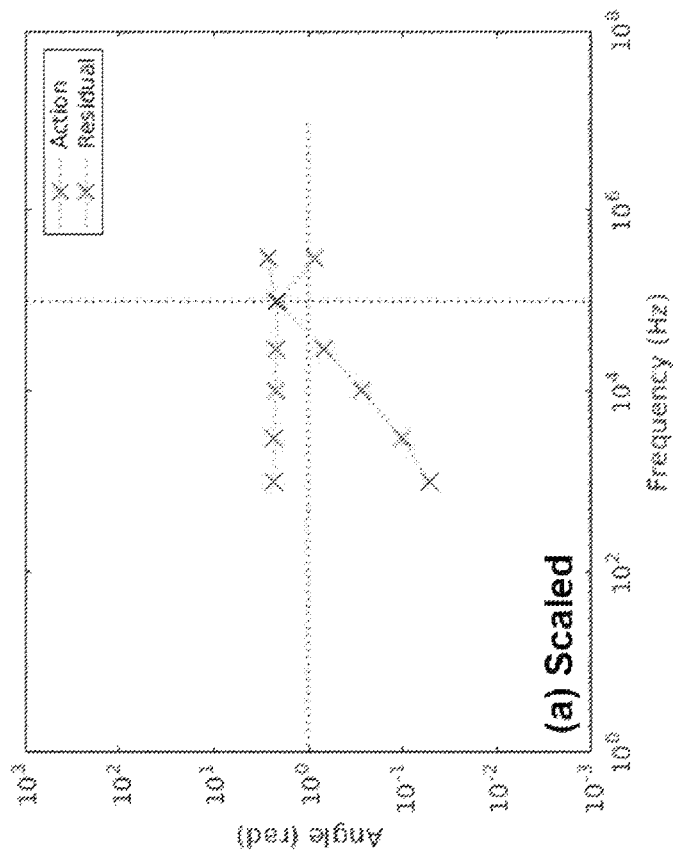
FIG. 12A shows the magnitude in radians of the Bode plot for the Closed Loop Transfer Function (command in to angle out) and the Disturbance Transfer Function (disturbance angle in to angle out). Each point represents a ratio of magnitudes at a particular frequency.
Figure 13:
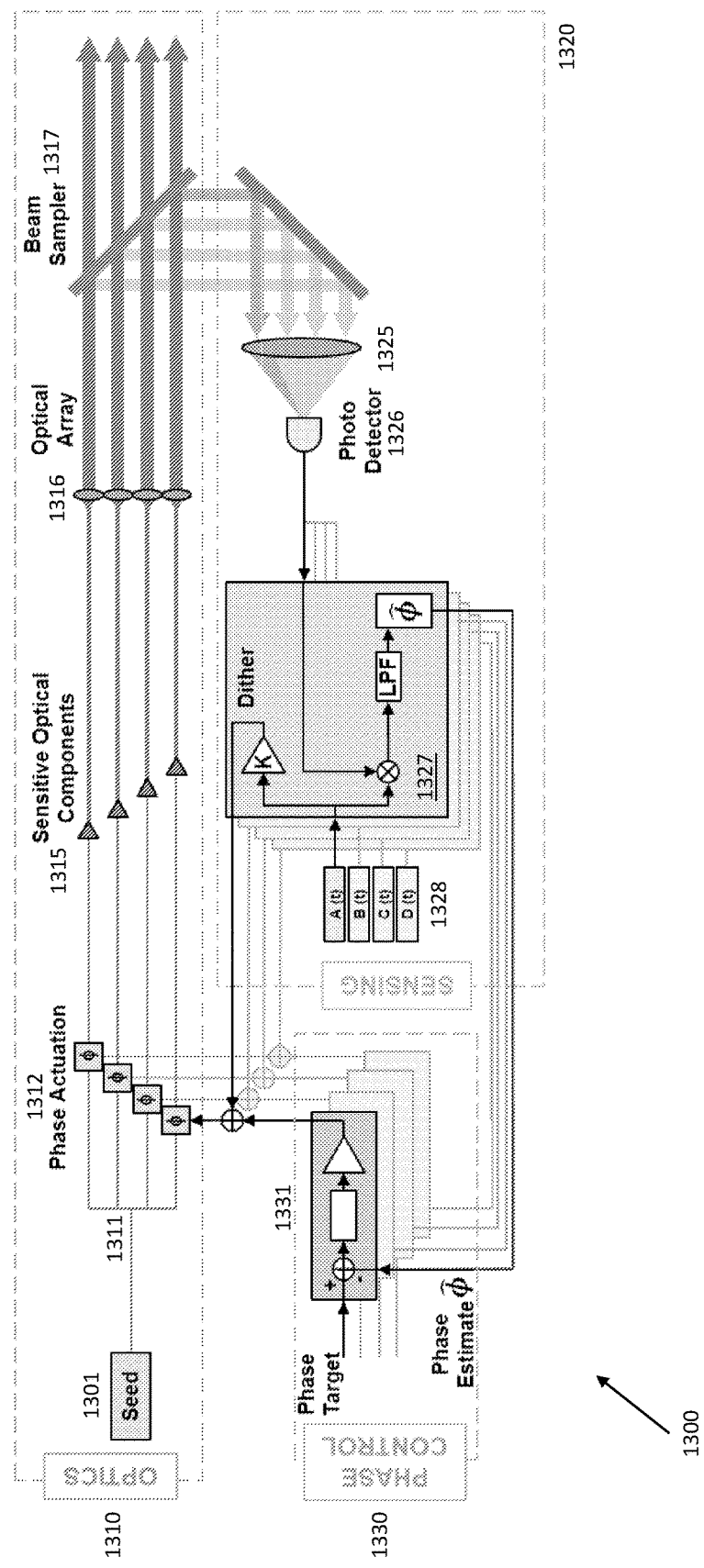
FIG. 13 illustrates a single on-axis, far-field intensity feedback control system.

FIGS. 11, 12A, and 12B show data collected for the configuration in FIG. 10. FIG. 11 shows raw control activity (drive voltage; upper traces) and residual disturbance (phase estimate) data at six different frequencies: 1 kHz, 3 kHz, 10 kHz, 30 kHz, 100 kHz, and 300 kHz. FIG. 12A shows the magnitude in radians of the Bode plot for the Closed Loop Transfer Function (command in to angle out) and the Disturbance Transfer Function (disturbance angle in to angle out). Each point represents a ratio of magnitudes at a particular frequency. FIG. 12B shows the data of FIG. 12A normalized to disturbance amplitude and overlaid upon expected performance for 100 kHz crossover frequency. Overlaying the experimental data on the theoretical curves as in FIG. 12B shows good agreement and provides verification that the 100 kHz crossover performance has been achieved.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system comprising:
    a seed laser to emit a seed beam;
    at least one first beam splitter, in optical communication with the seed laser, to split the seed beam into a reference beam and N array beams, where N is a positive integer greater than 1;
    a reference modulator, in optical communication with the at least one first beam splitter, to modulate the reference beam at a heterodyne reference frequency;
    at least one second beam splitter, in optical communication with the N array beams, to couple respective portions of the N array beams; and,
    for each of the N array beams,
        a photodetector, in optical communication with the at least one second beam splitter, to detect a heterodyne beat tone generated by interference of the corresponding array beam in the N array beams with at least a portion of the reference beam;
        sensing electronics, operably coupled to the photodetector, to generate a phase estimate based on the heterodyne beat tone;
        control electronics, operably coupled to the sensing electronics, to generate a phase error signal based on the phase estimate and on a phase target for the corresponding array beam, wherein the phase target is based on (i) a desired phase offset of the corresponding array beam relative to the other array beams, (ii) a bias affecting measurement of the phase estimate by the sensing electronics, and (iii) a measurement from an external feedback loop; and
        a phase modulator, operably coupled to the control electronics, to modulate a phase of the corresponding array beam based on the phase error signal,
        wherein the sensing electronics are configured to detect in-phase and quadrature components of the heterodyne beat tone, to generate the phase estimate based on the in-phase and quadrature components, and to generate a magnitude of the beat tone based on the in-phase and quadrature components, and
        wherein the control electronics are configured to control a polarization and a broadening waveform modulation of the corresponding array beam based on the magnitude of the beat tone.

2. The system of claim 1, wherein the reference modulator is configured to modulate the reference beam with a first dither signal and a second dither signal for controlling the polarization of the corresponding array beam and to modulate the reference beam with a third dither signal for controlling the broadening waveform modulation of the corresponding array beam.

3. The system of claim 1, wherein the sensing electronics and the control electronics are implemented in a field-programmable gate array.

4. The system of claim 1, wherein the control electronics are configured to determine the phase error signal.

5. The system of claim 1, wherein the control electronics are configured to determine a polarization state of the corresponding array beam based on an amplitude of the heterodyne beat tone, and further comprising, for each of the N array beams, a polarization controller to manipulate the polarization state of the corresponding array beam based on feedback from the control electronics.

6. The system of claim 1, wherein the control electronics are configured to store the phase estimate, the phase target, and the phase error signal as respective digital numbers ranging from $-\pi$ to $+\pi$.

7. A system comprising:
a seed laser to emit a seed beam;
at least one first beam splitter, in optical communication with the seed laser, to split the seed beam into a reference beam and N array beams, where N is a positive integer greater than 1;
a reference modulator, in optical communication with the at least one first beam splitter, to modulate the reference beam at a heterodyne reference frequency;
at least one second beam splitter, in optical communication with the N array beams, to couple respective portions of the N array beams; and,
for each of the N array beams,
  a photodetector, in optical communication with the at least one second beam splitter, to detect a heterodyne beat tone generated by interference of the corresponding array beam in the N array beams with at least a portion of the reference beam;
  sensing electronics, operably coupled to the photodetector, to generate a phase estimate based on the heterodyne beat tone;
  control electronics, operably coupled to the sensing electronics, to generate a phase error signal based on the phase estimate and on a phase target for the corresponding array beam, wherein the phase target is based on (i) a desired phase offset of the corresponding array beam relative to the other array beams, (ii) a bias affecting measurement of the phase estimate by the sensing electronics, and (iii) a measurement from an external feedback loop; and
  a phase modulator, operably coupled to the control electronics, to modulate a phase of the corresponding array beam based on the phase error signal,
  wherein the phase error signal is a sum of (i) the desired phase offset, (ii) the bias, and (iii) the measurement from the external feedback loop and the control electronics are configured to perform integer rollover on the sum so that the phase error signal is a digital number ranging from $-\pi$ to $+\pi$.

8. A system comprising:
a seed laser to emit a seed beam;
at least one first beam splitter, in optical communication with the seed laser, to split the seed beam into a reference beam and N array beams, where N is a positive integer greater than 1;
a reference modulator, in optical communication with the at least one first beam splitter, to modulate the reference beam at a heterodyne reference frequency;
at least one second beam splitter, in optical communication with the N array beams, to couple respective portions of the N array beams; and,
for each of the N array beams,
  a photodetector, in optical communication with the at least one second beam splitter, to detect a heterodyne beat tone generated by interference of the corresponding array beam in the N array beams with at least a portion of the reference beam;
  sensing electronics, operably coupled to the photodetector, to generate a phase estimate based on the heterodyne beat tone;
  control electronics, operably coupled to the sensing electronics, to generate a phase error signal based on the phase estimate and on a phase target for the corresponding array beam, wherein the phase target is based on (i) a desired phase offset of the corresponding array beam relative to the other array beams, (ii) a bias affecting measurement of the phase estimate by the sensing electronics, and (iii) a measurement from an external feedback loop; and
  a phase modulator, operably coupled to the control electronics, to modulate a phase of the corresponding array beam based on the phase error signal,
  wherein the control electronics are configured to generate the phase target by subtracting the phase error signal from the phase estimate and to perform integer rollover on the phase target so that the phase target is a digital number ranging from $-\pi$ to $+\pi$.

9. A system comprising:
a seed laser to emit a seed beam;
at least one first beam splitter, in optical communication with the seed laser, to split the seed beam into a reference beam and N array beams, where N is a positive integer greater than 1;
a reference modulator, in optical communication with the at least one first beam splitter, to modulate the reference beam at a heterodyne reference frequency;
at least one second beam splitter, in optical communication with the N array beams, to couple respective portions of the N array beams;
a waveform generator to generate a spectral broadening waveform;
another reference modulator, operably coupled to the waveform generator, to modulate the reference beam with a reference copy of the spectral broadening waveform; and
for each of the N array beams,
  a photodetector, in optical communication with the at least one second beam splitter, to detect a heterodyne beat tone generated by interference of the corresponding array beam in the N array beams with at least a portion of the reference beam;
  sensing electronics, operably coupled to the photodetector, to generate a phase estimate based on the heterodyne beat tone;
  control electronics, operably coupled to the sensing electronics, to generate a phase error signal based on the phase estimate and on a phase target for the corresponding array beam, wherein the phase target is based on (i) a desired phase offset of the corresponding array beam relative to the other array beams, (ii) a bias affecting measurement of the phase estimate by the sensing electronics, and (iii) a measurement from an external feedback loop;
  a phase modulator, operably coupled to the control electronics, to modulate a phase of the corresponding array beam based on the phase error signal; and
  a modulator, operably coupled to the waveform generator, to modulate the corresponding array beam with a corresponding copy of the spectral broadening waveform,
  wherein the control electronics are configured to detect alignment of the reference copy of spectral broadening waveform modulated onto the reference beam with respect to the corresponding copy of the spectral broadening waveform modulated onto the corresponding array beam based on an amplitude of the heterodyne beat tone and to trim the corresponding copy of the spectral broadening waveform driving the modulator based on the alignment.

10. A method comprising:
emitting a seed beam from a seed laser;
splitting the seed beam into a reference beam and N array beams, where N is a positive integer greater than 1;
modulating the reference beam at a heterodyne reference frequency; and
for each of the N array beams,
- detecting a heterodyne beat tone generated by interference of the corresponding array beam in the N array beams with at least a portion of the reference beam;
- generating a phase estimate based on the heterodyne beat tone;
- generating a phase error signal based on the phase estimate and on a phase target for the corresponding array beam, wherein the phase target is based on (i) a desired phase offset of the corresponding array beam relative to the other array beams, (ii) a bias affecting measurement of the phase estimate, and (iii) a measurement from an external feedback loop;
- modulating a phase of the corresponding array beam based on the phase error signal;
- detecting in-phase and quadrature components of the heterodyne beat tone;
- generating a magnitude of the beat tone based on the in-phase and quadrature components; and
- controlling a polarization and a broadening waveform modulation of the corresponding array beam based on the magnitude of the beat tone,
- wherein generating the phase estimate is based on the in-phase and quadrature components.

11. The method of claim 10, further comprising:
modulating the reference beam with a first dither signal and a second dither signal for controlling the polarization of the corresponding array beam; and
modulating the reference beam with a third dither signal for controlling the broadening waveform modulation of the corresponding array beam.

12. The method of claim 10, further comprising, for each of the N array beams:
determining a polarization state of the corresponding array beam based on an amplitude of the heterodyne beat tone; and
manipulating the polarization state of the corresponding array beam to match a polarization state of the reference beam.

13. The method of claim 10, further comprising:
storing the phase estimate, the phase target, and the phase error signal as respective digital numbers ranging from $-\pi$ to $+\pi$.

14. A method comprising:
emitting a seed beam from a seed laser;
splitting the seed beam into a reference beam and N array beams, where N is a positive integer greater than 1;
modulating the reference beam at a heterodyne reference frequency; and
for each of the N array beams,
- detecting a heterodyne beat tone generated by interference of the corresponding array beam in the N array beams with at least a portion of the reference beam;
- generating a phase estimate based on the heterodyne beat tone;
generating a phase error signal based on the phase estimate and on a phase target for the corresponding array beam, wherein the phase target is based on (i) a desired phase offset of the corresponding array beam relative to the other array beams, (ii) a bias affecting measurement of the phase estimate, and (iii) a measurement from an external feedback loop; and
modulating a phase of the corresponding array beam based on the phase error signal,
wherein generating the phase error signal comprises generating a sum of (i) the desired phase offset, (ii) the bias, and (iii) the measurement from the external feedback loop and performing integer rollover on the sum so that the phase error signal is a digital number ranging from $-\pi$ to $+\pi$.

15. A method comprising:
emitting a seed beam from a seed laser;
splitting the seed beam into a reference beam and N array beams, where N is a positive integer greater than 1;
modulating the reference beam at a heterodyne reference frequency; and
for each of the N array beams,
- detecting a heterodyne beat tone generated by interference of the corresponding array beam in the N array beams with at least a portion of the reference beam;
- generating a phase estimate based on the heterodyne beat tone;
- generating a phase error signal based on the phase estimate and on a phase target for the corresponding array beam, wherein the phase target is based on (i) a desired phase offset of the corresponding array beam relative to the other array beams, (ii) a bias affecting measurement of the phase estimate, and (iii) a measurement from an external feedback loop; and
- modulating a phase of the corresponding array beam based on the phase error signal,
- wherein generating the phase target comprises subtracting the phase error signal from the phase estimate and performing integer rollover on the phase target so that the phase target is a digital number ranging from $-\pi$ to $+\pi$.

16. A method comprising:
emitting a seed beam from a seed laser;
splitting the seed beam into a reference beam and N array beams, where N is a positive integer greater than 1;
modulating the reference beam at a heterodyne reference frequency;
modulating the reference beam with a reference copy of a spectral broadening waveform; and
for each of the N array beams,
- detecting a heterodyne beat tone generated by interference of the corresponding array beam in the N array beams with at least a portion of the reference beam;
- generating a phase estimate based on the heterodyne beat tone;
- generating a phase error signal based on the phase estimate and on a phase target for the corresponding array beam, wherein the phase target is based on (i) a desired phase offset of the corresponding array beam relative to the other array beams, (ii) a bias affecting measurement of the phase estimate, and (iii) a measurement from an external feedback loop;
- modulating a phase of the corresponding array beam based on the phase error signal;
- modulating the corresponding array beam with a corresponding copy of the spectral broadening waveform;
- detecting alignment of the reference copy of spectral broadening waveform modulated onto the reference beam with respect to the corresponding copy of the spectral broadening waveform modulated onto the corresponding array beam based on an amplitude of the heterodyne beat tone; and trimming the corresponding copy of the spectral broadening waveform based on the alignment.

\* \* \* \* \*